US011970906B2

(12) United States Patent
Francoeur et al.

(10) Patent No.: US 11,970,906 B2
(45) Date of Patent: Apr. 30, 2024

(54) ROLLER BLIND LIMITER ASSEMBLY, ROLLER BLIND MECHANISM, ROLLER BLIND SYSTEM AND METHOD FOR ADJUSTING AN END POSITION OF A ROLLER BLIND

(71) Applicant: 7912854 CANADA INC., Terrebonne (CA)

(72) Inventors: Alain Francoeur, Sainte-Anne-des-Plaines (CA); Augustin Archambault, Sherbrooke (CA)

(73) Assignee: 7912854 CANADA INC. (CA)

( * ) Notice: Subject to any disclaimer, the term of this patent is extended or adjusted under 35 U.S.C. 154(b) by 127 days.

(21) Appl. No.: 17/419,164

(22) PCT Filed: Dec. 27, 2019

(86) PCT No.: PCT/CA2019/051911
§ 371 (c)(1),
(2) Date: Jun. 28, 2021

(87) PCT Pub. No.: WO2020/132750
PCT Pub. Date: Jul. 2, 2020

(65) Prior Publication Data

US 2022/0106835 A1 Apr. 7, 2022

Related U.S. Application Data

(60) Provisional application No. 62/785,787, filed on Dec. 28, 2018.

(51) Int. Cl.

| | |
|---|---|
| ***E06B 9/88*** | (2006.01) |
| ***E06B 9/42*** | (2006.01) |
| *E06B 9/80* | (2006.01) |

(52) U.S. Cl.
CPC .................. *E06B 9/88* (2013.01); *E06B 9/42* (2013.01); *E06B 2009/801* (2013.01)

(58) Field of Classification Search
CPC ......... E06B 9/88; E06B 9/42; E06B 2009/801
See application file for complete search history.

(56) References Cited

U.S. PATENT DOCUMENTS

| | | | |
|---|---|---|---|
| 1,725,285 | A | 8/1929 | Lalonde |
| 4,373,569 | A | 2/1983 | Barettella |

(Continued)

FOREIGN PATENT DOCUMENTS

| | | | |
|---|---|---|---|
| DE | 202014100065 | U1 | 4/2014 |
| DE | 202016105076 | U1 | 12/2017 |

(Continued)

OTHER PUBLICATIONS

Patent Cooperation Treaty; International Search Report cited in PCT/CA2019/051911 dated Mar. 23, 2020; 5 pages.

(Continued)

*Primary Examiner* — Beth A Stephan
(74) *Attorney, Agent, or Firm* — Shumaker, Loop & Kendrick, LLP; Patrick B. Horne

(57) ABSTRACT

The present disclosure concerns a roller blind limiter assembly comprising a support-engaging member, a limit screw and a limit nut threadedly engaged therewith, operatively connectable to a roller blind tube and travelling along the screw upon extension and retraction of a blind, wherein, in use, the limit nut abuts a winding stopper of the limit screw when the blind reaches upper and/or lower end positions. The roller blind limiter assembly is configurable in a locked configuration wherein the limit screw is fixedly mountable to the roller blind support, and an unlocked configuration wherein the support-engaging member is pivotable about the longitudinal direction with respect to the limit screw. The (Continued)

present disclosure also concerns a roller blind mechanism and a roller blind system comprising such a limiter assembly, and a method for adjusting an end position of a roller blind.

19 Claims, 27 Drawing Sheets

(56) References Cited

U.S. PATENT DOCUMENTS

| | | | | |
|---|---|---|---|---|
| 4,444,242 | A | 4/1984 | Amsler et al. | |
| 5,907,227 | A | 5/1999 | Domel et al. | |
| 6,125,907 | A | 10/2000 | Tokuyama et al. | |
| 7,240,715 | B2 | 7/2007 | Hoffmann | |
| 7,617,859 | B2 | 11/2009 | Auger | |
| 8,403,020 | B2 | 3/2013 | Rasmussen | |
| 8,453,708 | B2 | 6/2013 | Rysholt | |
| 9,617,787 | B2 | 4/2017 | Bohlen | |
| 9,702,187 | B2 | 7/2017 | Holt et al. | |
| 9,926,740 | B2 | 3/2018 | Wilfrid et al. | |
| 9,945,177 | B2 | 4/2018 | Drew et al. | |
| 10,273,751 | B2 | 4/2019 | Bohlen et al. | |
| 10,435,945 | B2 | 10/2019 | Buccola, Jr. et al. | |
| 11,396,773 | B2 * | 7/2022 | Smith | E06B 9/88 |
| 2011/0005694 | A1 | 1/2011 | Ng | |
| 2012/0090795 | A1 | 4/2012 | Kirby | |
| 2018/0080278 | A1 | 3/2018 | Huang | |
| 2018/0106107 | A1 | 4/2018 | Smith et al. | |
| 2019/0162021 | A1 * | 5/2019 | De Vries | E06B 9/60 |
| 2019/0178030 | A1 | 6/2019 | Brown, II et al. | |

FOREIGN PATENT DOCUMENTS

| | | | |
|---|---|---|---|
| EP | 1201951 | A1 | 5/2002 |
| EP | 1746245 | A2 | 1/2007 |
| EP | 1921246 | A2 | 5/2008 |
| EP | 2440733 | A2 | 4/2012 |
| EP | 2820224 | B1 | 4/2020 |
| GB | 1125426 | A | 8/1968 |
| GB | 2564228 | A | 1/2019 |
| WO | 2017211997 | A1 | 12/2017 |
| WO | 2017213499 | A1 | 12/2017 |

OTHER PUBLICATIONS

Patent Cooperation Treaty; Written Opinion cited in PCT/CA2019/051911 dated Mar. 23, 2020; 5 pages.

* cited by examiner

FIG. 17B
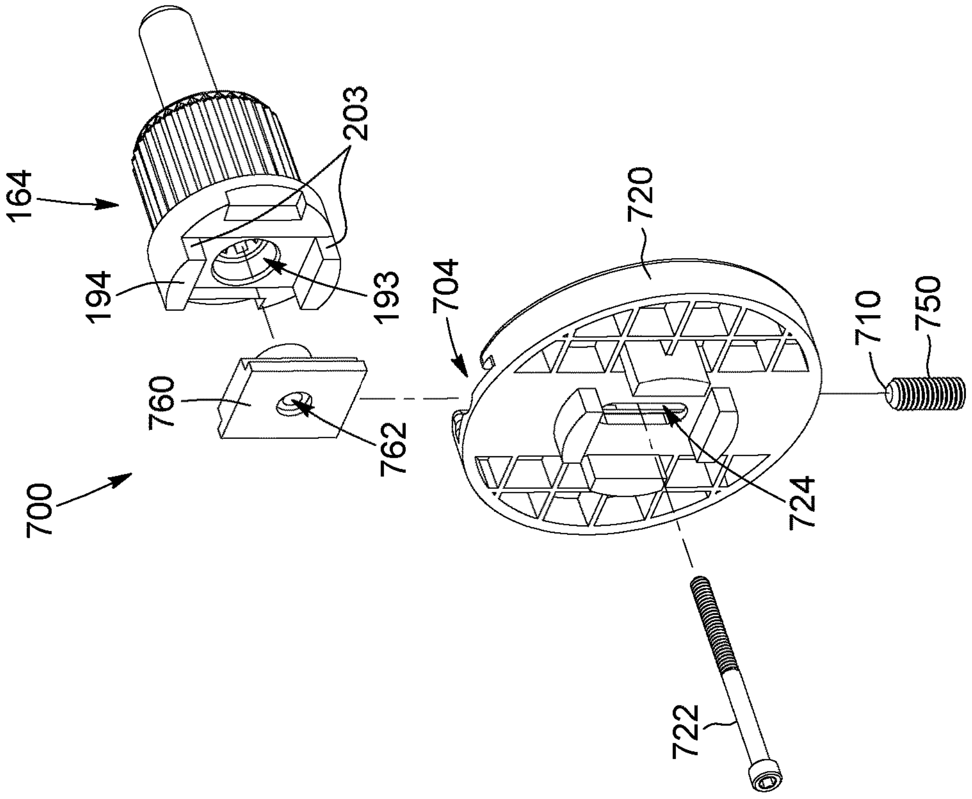
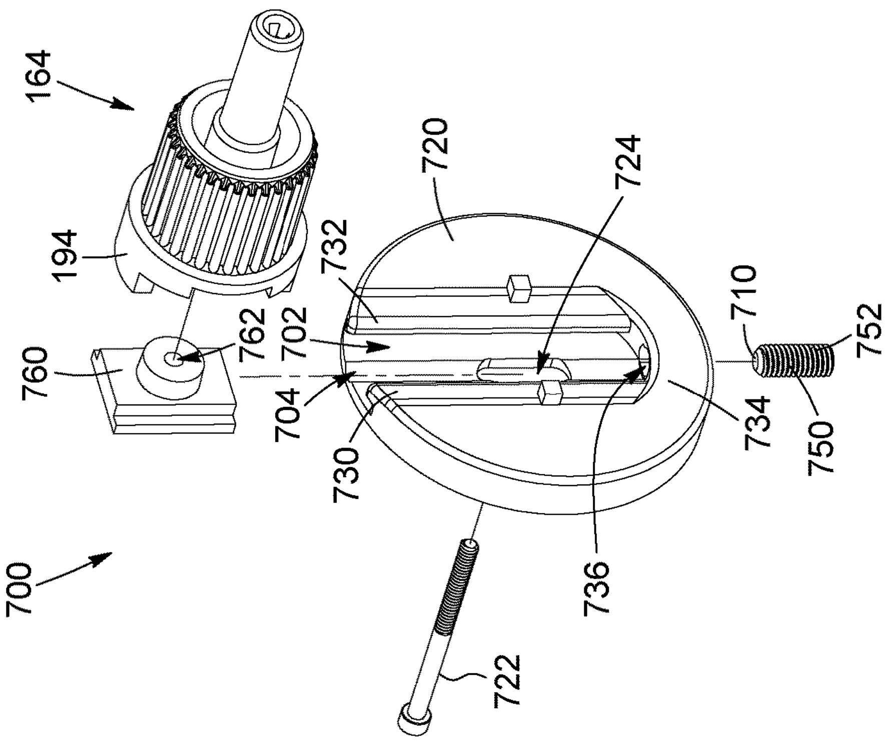
FIG. 17A

ROLLER BLIND LIMITER ASSEMBLY, ROLLER BLIND MECHANISM, ROLLER BLIND SYSTEM AND METHOD FOR ADJUSTING AN END POSITION OF A ROLLER BLIND

PRIOR APPLICATION

The present application claims priority from U.S. provisional patent application No. 62/785,787, filed on Dec. 28, 2018 and entitled "ADJUSTABLE ROLLER BLIND MECHANISM", the disclosure of which being hereby incorporated by reference in its entirety.

TECHNICAL FIELD

The technical field relates to roller blind mechanisms for roller blinds, and more particularly to roller blind limiter assemblies for roller blind mechanisms and to methods for adjusting an end position of a roller blind.

BACKGROUND

For instance when a plurality of roller blinds are configured in an adjacent configuration, it might be necessary to adjust the extended configuration or the retracted configuration of at least one of the blinds, for the plurality of roller blinds to have substantially similar extended and/or retracted configurations. However, such adjustments might be particularly complex, and require many operations.

Moreover, roller blind mechanisms often comprise a torsion spring assisting the winding of a blind. However, the spring constant has to be chosen very accurately, depending, for instance, on the weight of the blind. Moreover, the existing roller blind mechanisms might not be fully satisfactory, especially when a plurality of roller blinds are configured in an adjacent configuration, for weight bars of the roller blinds to be substantially aligned with each other, when the roller blinds are either in a wound configuration (or retracted configuration), or in an unwound configuration (or extended configuration). Moreover, a holder assembly is often required to maintain a preload of the spring while the roller blind is installed. Such holder assemblies are usually costly and cumbersome. Known spring assisted adjustable roller blind mechanisms also usually comprise numerous independent components.

In view of the above, there is a need for a roller blind mechanism which would be able to overcome or at least minimize some of the above-discussed prior art concerns.

BRIEF SUMMARY

It is therefore an aim of the present invention to address the above-mentioned issues.

According to a general aspect, there is provided a roller blind limiter assembly for a roller blind system comprising a roller blind tube with a blind mounted thereto, the blind being extendable and retractable between upper and lower end positions. The roller blind limiter assembly has a longitudinal direction and comprises a support-engaging member mountable to a roller blind support; a limit screw comprising a threaded spindle and a winding stopper; and a limit nut threadedly engaged with the threaded spindle of the limit screw, operatively connectable to the roller blind tube and travelling along the threaded spindle upon extension and retraction of the blind, wherein, in use, the limit nut abuts the winding stopper when the blind reaches one of the upper and lower end positions. The roller blind limiter assembly is configurable in a locked configuration wherein the limit screw is fixedly mountable to the roller blind support via the support-engaging member, and an unlocked configuration wherein the support-engaging member is pivotable about the longitudinal direction with respect to the limit screw so as to modify said at least one of the upper and lower end positions.

According to another general aspect, there is provided a roller blind mechanism for a roller blind system comprising a roller blind tube with a blind mounted thereto, the blind being extendable and retractable between upper and lower end positions. The roller blind mechanism comprises a roller blind limiter assembly according to the present disclosure; a torsion spring extending along the longitudinal direction of the roller blind limiter assembly and having a fixed end portion engaged with the support-engaging member and a rotatable end portion angularly couplable with the roller blind tube; and a spring stiffness adjuster at least partially surrounded by the torsion spring, comprising a thread conforming to coils of the torsion spring to be displaceable along the torsion spring upon rotation of the spring stiffness adjuster about the longitudinal direction, and defining an active portion of the torsion spring upon loading of the torsion spring.

According to another general aspect, there is provided a roller blind mechanism for a roller blind system comprising a roller blind tube with a blind mounted thereto, the blind being extendable and retractable between upper and lower end positions. The roller blind mechanism has a longitudinal direction and comprises a roller blind-stopping system comprising a holding portion, a threaded spindle and a winding stopper; a limit nut threadedly engaged with the threaded spindle, operatively connectable to the roller blind tube and travelling along the threaded spindle upon extension and retraction of the blind, wherein, in use, the limit nut abuts the winding stopper when the blind reaches one of the upper and lower end positions; and a mechanism-levelling system fixedly mountable to a roller blind support and defining a roller blind stopper-receiving cavity to receive at least partially the holding portion of the roller blind-stopping system. The mechanism-levelling system comprises a bottom abutting portion at least partially supporting the holding portion when received in the roller blind stopper-receiving cavity, the bottom abutting portion being configurable into at least two vertical positions so as to adjust a vertical position of the roller blind mechanism.

According to another general aspect, there is provided a roller blind system comprising a roller blind tube defining a mechanism-receiving cavity; a blind mounted to the roller blind tube; and a roller blind mechanism according to the present disclosure inserted into the mechanism-receiving cavity.

According to another general aspect, there is provided a method for adjusting an end position of a roller blind, the method comprising providing a roller blind system comprising: a roller blind tube defining a mechanism-receiving cavity and having a longitudinal direction; a blind mounted to the roller blind tube and extendable and retractable between upper and lower end positions; and a roller blind mechanism inserted into the mechanism-receiving cavity and comprising a roller blind limiter assembly with a support-engaging member mountable to a roller blind support, a limit screw comprising a threaded spindle and a winding stopper and a limit nut threadedly engaged with the threaded spindle of the limit screw, operatively connectable to the roller blind tube and travelling along the threaded spindle upon extension and retraction of the blind. The method further comprises configuring the roller blind limiter assembly in an unlocked configuration; pivoting the support-engaging member about the longitudinal direction with respect to the limit screw; and configuring the roller blind limiter assembly in a locked configuration wherein the limit screw is fixedly mountable to the roller blind support via the support-engaging member.

According to another general aspect, there is provided an adjustable roller blind mechanism for a roller blind tube defining a mechanism receiving cavity. The adjustable roller blind mechanism has a first axis and comprises a bracket mounting extremity, an opposed free extremity insertable into the mechanism receiving cavity, a bearing sleeve angularly couplable to the roller blind tube upon rotation of the bearing sleeve about the first axis, a spring supporting sleeve angularly coupled to the bracket mounting extremity upon rotation of the spring supporting sleeve about the first axis, a torsion spring extending along the first axis and having a fixed end portion engaged to the spring supporting sleeve and a bearing mounting end portion engaged to the bearing sleeve and a spring stiffness adjuster comprising a thread conforming to coils of the torsion spring to be displaceable along the torsion spring upon rotation thereof about the first axis, and defining an active portion of the torsion spring upon loading of the torsion spring.

According to another general aspect, there is provided an adjustable roller blind mechanism for a roller blind tube defining a mechanism receiving cavity. The adjustable roller blind mechanism has a first axis and comprises a bracket mounting extremity, an opposed free extremity insertable into the mechanism receiving cavity, an abutting assembly comprising a body comprising a winding stopping portion and an angular position adjuster forming the bracket mounting extremity and configurable into a locked configuration in which the angular position adjuster is angularly coupled to the body upon rotation of the angular position adjuster about the first axis, and into an unlocked configuration in which the angular position adjuster is rotatably mounted to the body about the first axis. The adjustable roller blind mechanism further comprises a stopper angularly couplable to the roller blind tube upon rotation of the bearing sleeve about the first axis and displaceable along the body upon rotation of the roller blind tube, the stopper being abuttable against the winding stop portion.

According to another general aspect, there is provided a roller blind system comprising a roller blind tube defining a mechanism receiving cavity, and an adjustable roller blind mechanism according to the present disclosure inserted into the mechanism receiving cavity.

According to another general aspect, there is provided a method for adjusting the spring stiffness of a torsion spring of a roller blind mechanism, comprising providing an adjustable roller blind mechanism according to the present disclosure, rotating the spring stiffness adjuster about the first axis; and preloading the torsion spring.

According to another general aspect, there is provided a method for adjusting the winding position of a roller blind system, comprising providing a roller blind system comprising a roller blind tube defining a mechanism receiving cavity with an adjustable roller blind mechanism according to the present disclosure inserted therein; configuring the angular position adjuster into the unlocked configuration; pivoting the angular position adjuster about the first pivot; and configuring the angular position adjuster into the locked configuration.

BRIEF DESCRIPTION OF THE DRAWINGS

FIGS. 17A and 17B are right and left perspective views, exploded, of the mechanism-levelling system of FIG. 15;

DETAILED DESCRIPTION

Figure 1:
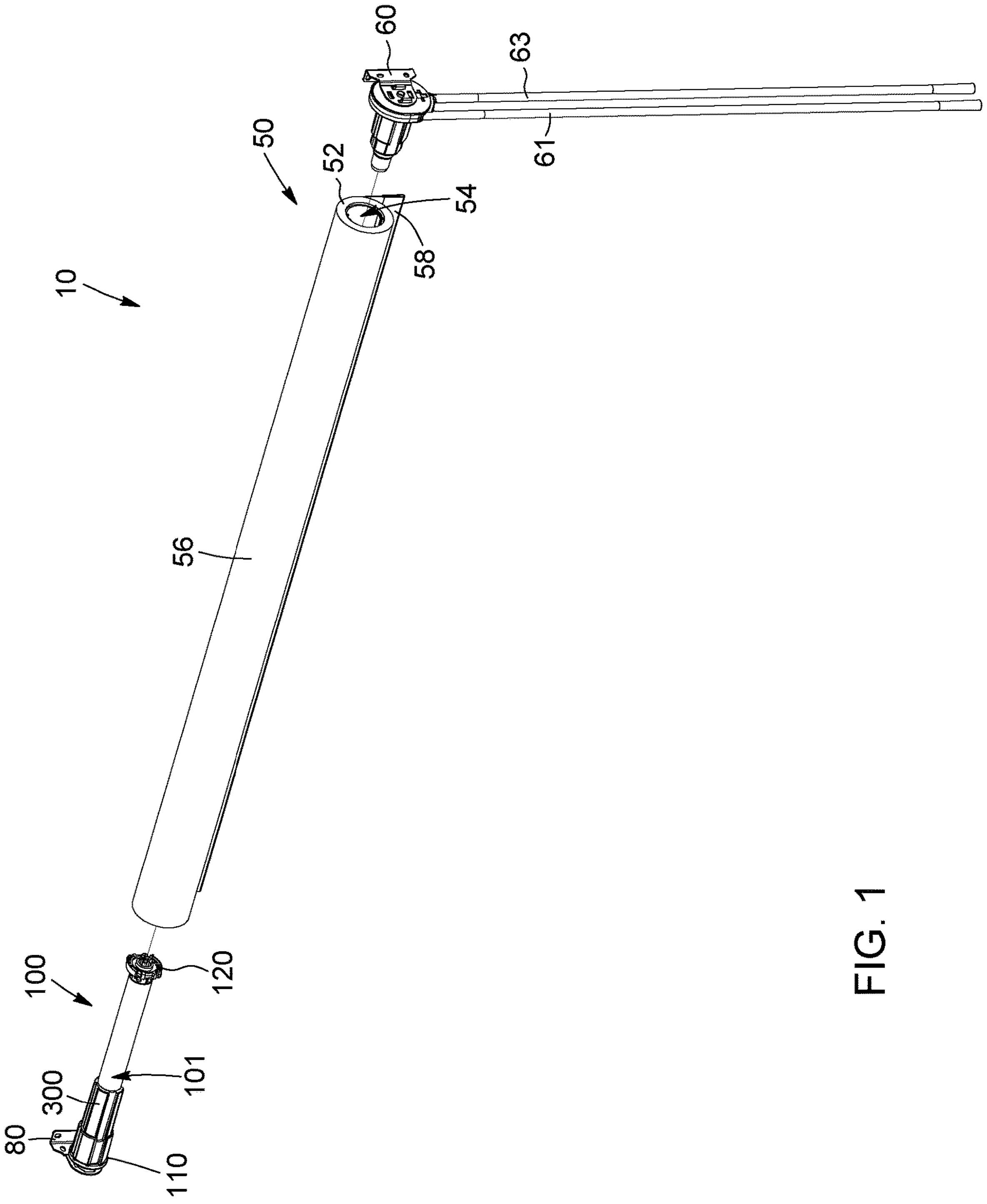
FIG. 1 is a front perspective view, exploded, of a roller blind system comprising a roller blind tube and a roller blind mechanism in accordance with an embodiment.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as “above”, “below”, “forward”, “rearward”, “left”, “right” and the like should, unless otherwise indicated, be taken in the context of the figures only and should not be considered limiting. Moreover, the figures are meant to be illustrative of certain characteristics of the roller blind mechanism and the roller blind system and are not necessarily to scale.

To provide a more concise description, some of the quantitative expressions given herein may be qualified with the term “about”. It is understood that whether the term “about” is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of “one embodiment”, “an embodiment” or “some embodiments” do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to “some embodiments”, “an embodiment”, “one embodiment” or “other embodiments” means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms “including”, “comprising”, and grammatical variants thereof do not preclude the addition of one or more components, features, steps, or integers or groups thereof and that the terms are to be construed as specifying components, features, steps or integers. If the specification or claims refer to “an additional” element, that does not preclude there being more than one of the additional element. It is to be understood that where the claims or specification refer to “a” or “an” element, such reference is not be construed that there is only one of that element. It is to be understood that where the specification states that a component, feature, structure, or characteristic “may”, “might”, “can” or “could” be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Referring now to the drawings, and more particularly to FIG. 1, there is shown a roller blind system 10 comprising a roller blind tube assembly 50 and a roller blind mechanism 100 (or roller bling tube-supporting assembly 100). The roller blind tube assembly 50 comprises a roller blind tube 52 defining a mechanism-receiving cavity 54. Moreover, a blind 56 (or window covering 56, or shade 56), for instance at least partially made of fabric or of one or more layers of a flexible element, is mounted to the roller blind tube 52 and is wrapped around the roller blind tube 52. The present disclosure is obviously not limited to a blind that would be formed of fabrics but could also comprise a venetian blind or any other element extendable and retractable in a substantially vertical plane. The blind 56 comprises, in the embodiment shown, a weight bar 58 secured to a bottom edge of the blind 56 (or fabric 56) to maintain the blind in a substantially vertical configuration when the blind 56 is in an unwound configuration (or extended configuration), for instance for the blind to at least partially cover a window.

The roller blind system 10 further comprises an actuator 60 configured to cooperate with the roller blind tube 52 to extend and retract the blind 56. In other words, the actuator 60 cooperates with the roller blind tube 52. to configure the blind 56 either in the unwound configuration (or extended configuration) wherein the bottom edge (for instance the weight bar 58) is in a lower end position, or in a wound configuration (or retracted configuration), in which the blind 56 is at least partially wrapped around the roller blind tube 52 and wherein the bottom edge is in an upper end position. In the embodiment shown, the actuator 60 comprises first and second actuation rods 61, 63, but the present disclosure is not limited to a roller blind mechanism for a roller blind system comprising first and second actuation rods; the roller blind mechanism of the present disclosure could be used with any other type of actuators, such as for instance and without being limitative a cord. The roller blind mechanism could also be used with a roller blind system of the free-lift style (i.e. actuated directly by a user pulling or pushing the bottom edge or any other part of the blind 56).

The roller blind mechanism 100 comprises a roller blind tube-supporting system 101 configured to support a portion of the roller blind tube 52 (for instance an end portion of the roller blind tube 52 opposed to an end portion cooperating with the roller blind actuator 60). As detailed below, the roller blind mechanism 100 further comprises a spring configured to store energy when the blind 56 is unwound, and to assist the actuator 60 and/or to ease the displacement of the blind 56 for it to be retracted toward the upper end position. In other words, the roller blind system 10 forms a window covering system comprising a blind or window covering or shade retractable and extendable for a bottom edge thereof to be displaceable along a substantially vertical direction between the upper and lower end positions.

Figure 2:
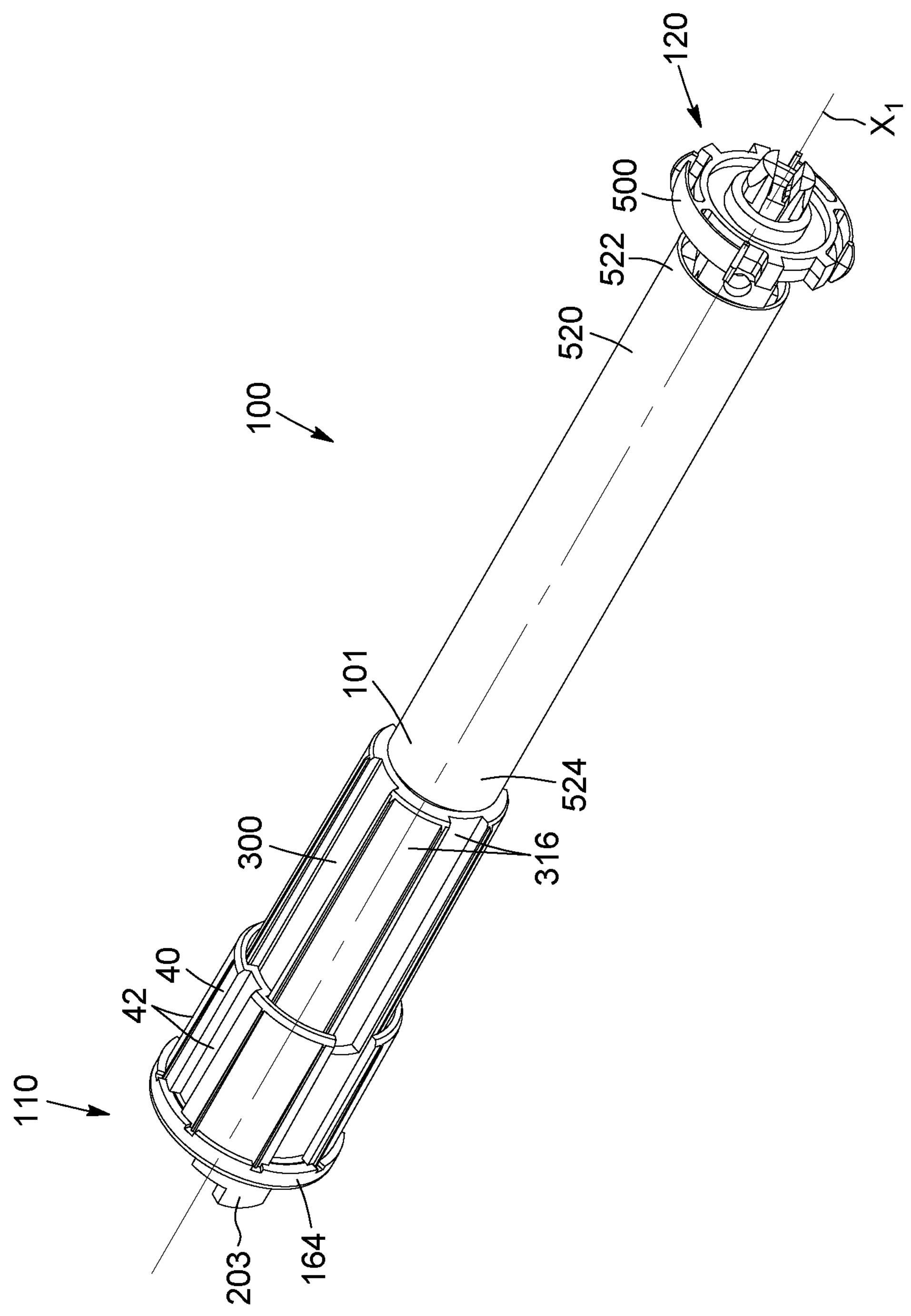
FIG. 2 is a front perspective view of the roller blind mechanism of FIG. 1.
Figure 3:
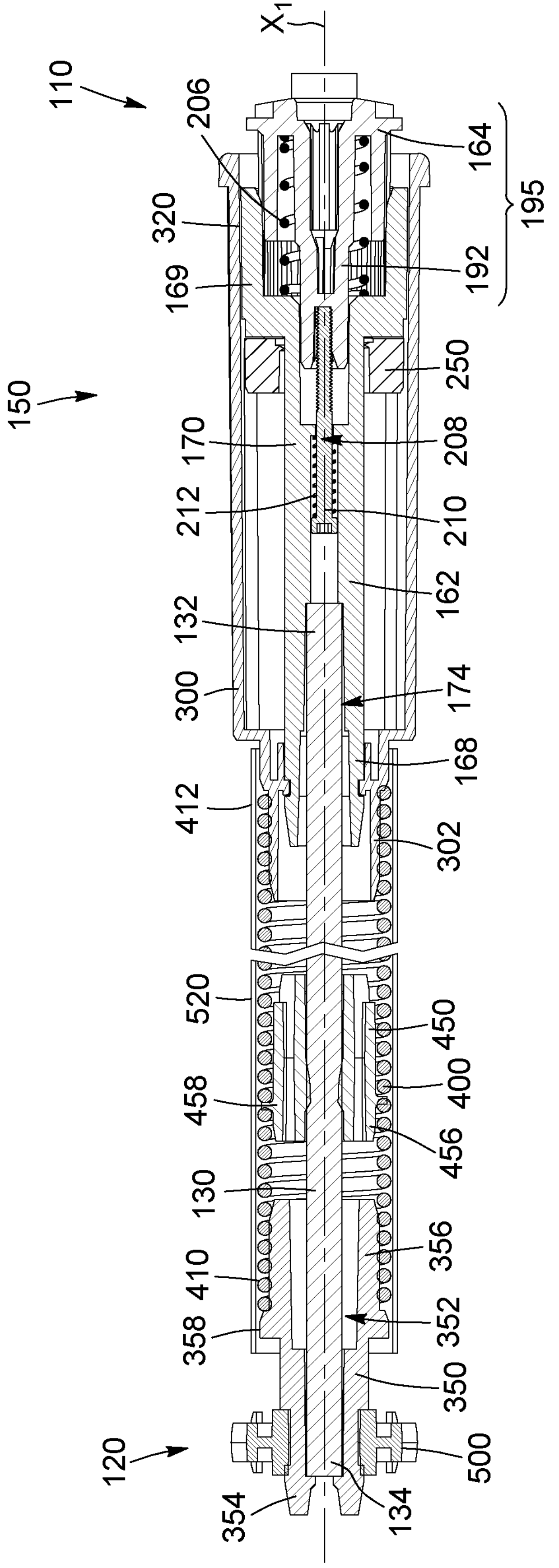
FIG. 3 is a cross-section view of the roller blind mechanism of FIG. 1, the roller blind mechanism comprising a roller blind limiter assembly and a spring stiffness adjuster.
Figure 12:
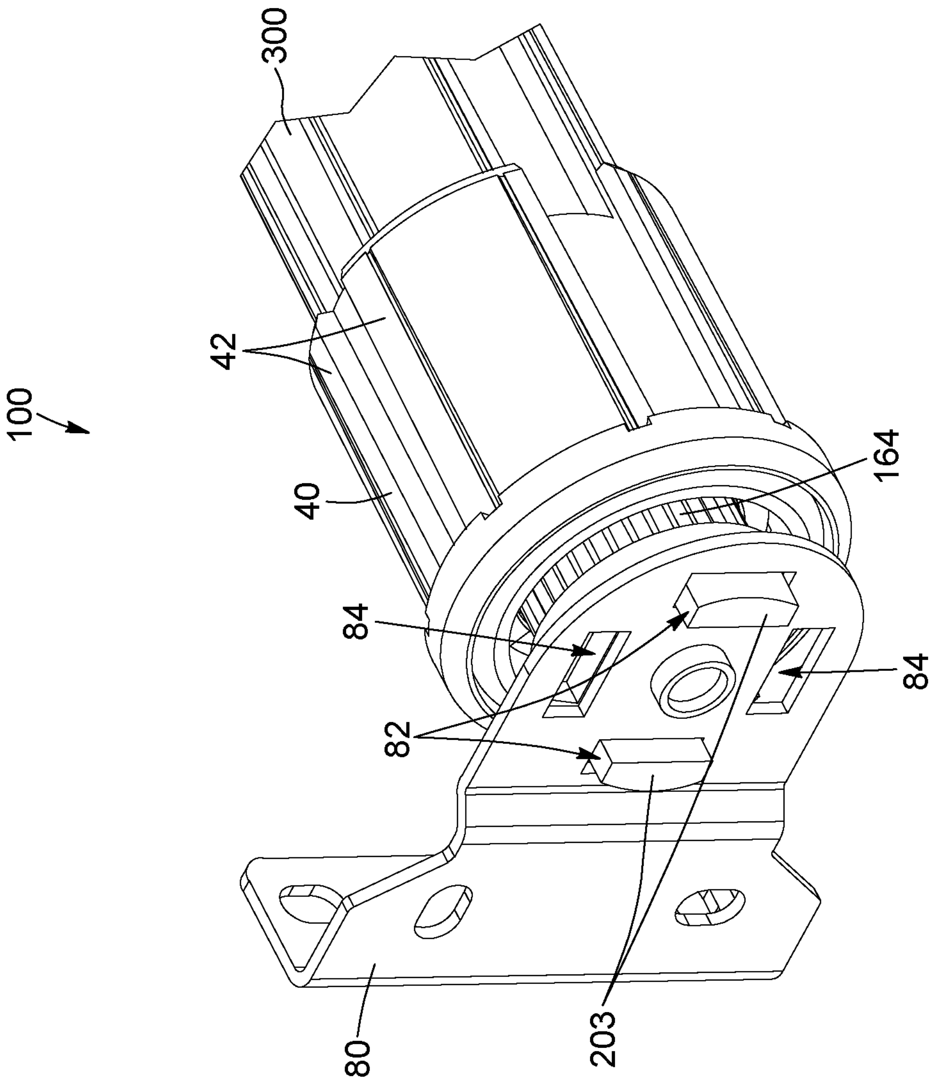
FIG. 12 is a sectioned perspective view of the roller blind mechanism of FIG. 1, the support-engaging member being engaged with a roller blind-supporting bracket.

Referring now more particularly to FIGS. 2 to 4B, the roller blind mechanism 100 is represented. In the embodiment shown, the roller blind mechanism 100 is at least partially insertable—or engageable—into the mechanism-receiving cavity 54 of the roller blind tube 52. The roller blind mechanism 100 comprises a support-mounting extremity 110, fixedly mountable to a holding element or holding surface or roller blind support (for instance a building structure), for instance via a roller blind-supporting bracket 80, as represented in FIG. 12, and an opposed free extremity 120, extending in the mechanism-receiving cavity 54 when the roller blind mechanism 100 is inserted therein. The roller blind mechanism 100 defines a first axis X1 (or longitudinal axis X1 or longitudinal direction) and comprises a shaft 130 (or coupling shaft 130 or angularly coupling shaft 130) extending along the first axis X1 between the support-mounting extremity 110 and the free extremity 120. In the embodiment shown, as represented in FIG. 3, the coupling shaft 130 has a substantially square-shaped cross-section along its length, but the shape of the shaft 130 could vary from the embodiment shown.

The different components of the roller blind mechanism 100 will now be described in more details.

Roller Blind Limiter Assembly—Roller Stopper Assembly

According to a first aspect of the present disclosure, in the embodiment shown, the roller blind mechanism 100 comprises a roller stopper assembly 150 (or roller blind limiter assembly 150 or internal roller blind limit assembly 150, in that it is at least partially contained in the mechanism-receiving cavity 54 of the roller blind tube 52) configured to limit the winding and/or unwinding of the blind 56 of the roller blind tube assembly 50. In other words, the roller stopper assembly 150 is configured to determine a vertical position of a lower end of the blind when configured in a wound configuration and/or in an unwound configuration. In yet other words, the roller blind limiter assembly 150 is configured, when operatively coupled via the roller blind mechanism 100 to the roller blind system 10, to determine at least one of the upper and lower end positions of the blind 56 when in the respective one of the extended and retracted configurations.

In the embodiment shown, the roller blind limiter assembly 150 has a longitudinal axis X1 (corresponding substantially to the roller blind mechanism 100 in the embodiment shown) and comprises, as detailed below, a support-engaging member 164 (or angular position adjuster 164) mountable to the holding element or the holding surface or the roller blind support, for instance via the roller blind-supporting bracket 80, a limit screw 162 (or abutting assembly 162) comprising a threaded spindle 170 (or spindle portion 170) and a winding stopper 172. The threaded spindle 170 and the support-engaging member 164 form together at least partially a roller blind-stopping system 160 (or abutting assembly 160) of the roller blind limiter assembly 150. The roller blind limiter assembly 150 further comprises a limit nut 250 (or stopper 250, or stop nut 250, or limit nut 250, or stopping wheel 250, or travelling nut 250) threadedly engaged with the threaded spindle 170 of the limit screw 162, operatively connectable to the roller blind tube 52 and travelling along the threaded spindle 170 upon extension and retraction of the blind 56 (i.e. upon pivoting of the roller blind tube 52 about the longitudinal direction X1). As detailed below, when in use, the limit nut 250 abuts the winding stopper 172 of the limit screw 162 when the roller blind 56 reaches one of the upper and lower end positions Moreover, as detailed below, the roller blind limiter assembly 150 is configurable in a locked configuration wherein the limit screw 162 is fixedly mountable to the roller blind support via the support-engaging member 164, and an unlocked configuration wherein the support-engaging member 164 is pivotable about the longitudinal axis X1 with respect to the limit screw 162 so as to modify the at least one of the upper and lower end positions.

The abutting assembly 160 (or roller blind-stopping system 160) is located in the embodiment shown at the support-mounting extremity 110 of the roller blind mechanism 100, for instance fixedly mounted (either directly or indirectly, as detailed below) to the roller blind bracket 80. The stopper 250 (or stop nut 250, or limit nut 250) is displaceable with regards to the abutting assembly 160 (at least with regards to the limit screw 162 thereof, in the embodiment shown) and abuttable against a portion of the abutting assembly 160 (namely the winding stopper 172) to limit at least one of the winding and the unwinding of the blind 56 of the roller blind system 10. In other words, as detailed below, the stopper 250 is operatively connected to the roller blind tube 52 so as to move towards or away from the winding stopper 172 as the blind 56 is extended or retracted. In yet other words, as the blind 56 (or shade 56) foes up and down, the stopper 250 moves laterally along the limit screw 162.

Roller Blind-Stopping System/Abutting Assembly

In the embodiment shown, as mentioned above, the limit screw 162 and the support-engaging member 164 are either configurable into the locked configuration in which the support-engaging member 164 is engaged with the limit screw 162 (i.e. is angularly coupled to the limit screw 162 upon rotation of the support-engaging member 164 about the longitudinal axis X1), and into the unlocked configuration in which the angular position adjuster 164 is pivotable about the first axis X1 (or longitudinal axis X1) with regards to the body 162 (or limit screw 162). The abutting assembly 160 (or roller blind-stopping system 160) further comprises a locking assembly 166 (or limiter-locking assembly 166) configured to lock the roller blind limiter assembly 150 in the locked configuration.

Limit Screw/Body

Figure 4A:
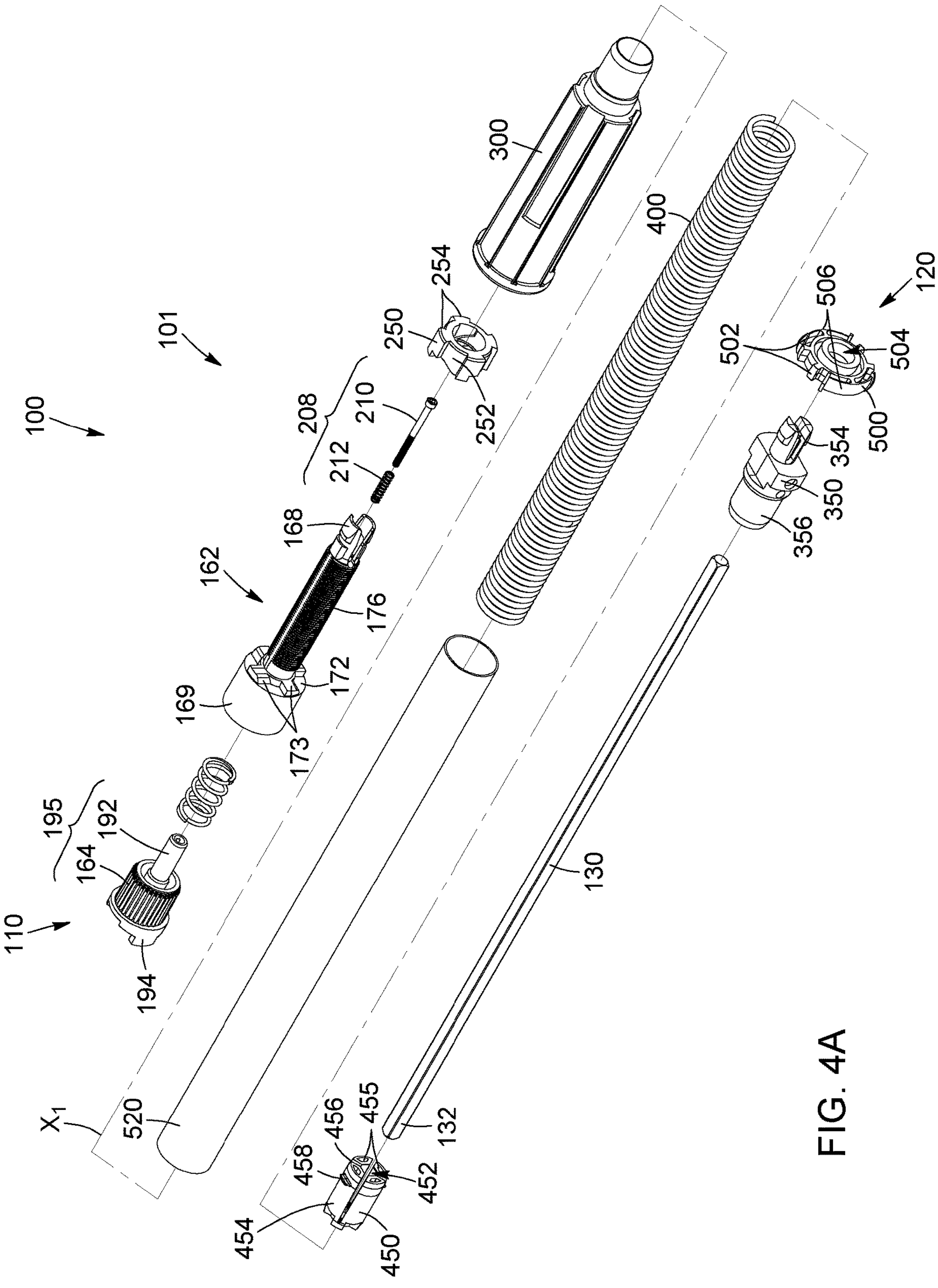
FIGS. 4A and 4B are respective right and left perspective views, exploded, of the roller blind mechanism of FIG. 1.
Figure 4B:
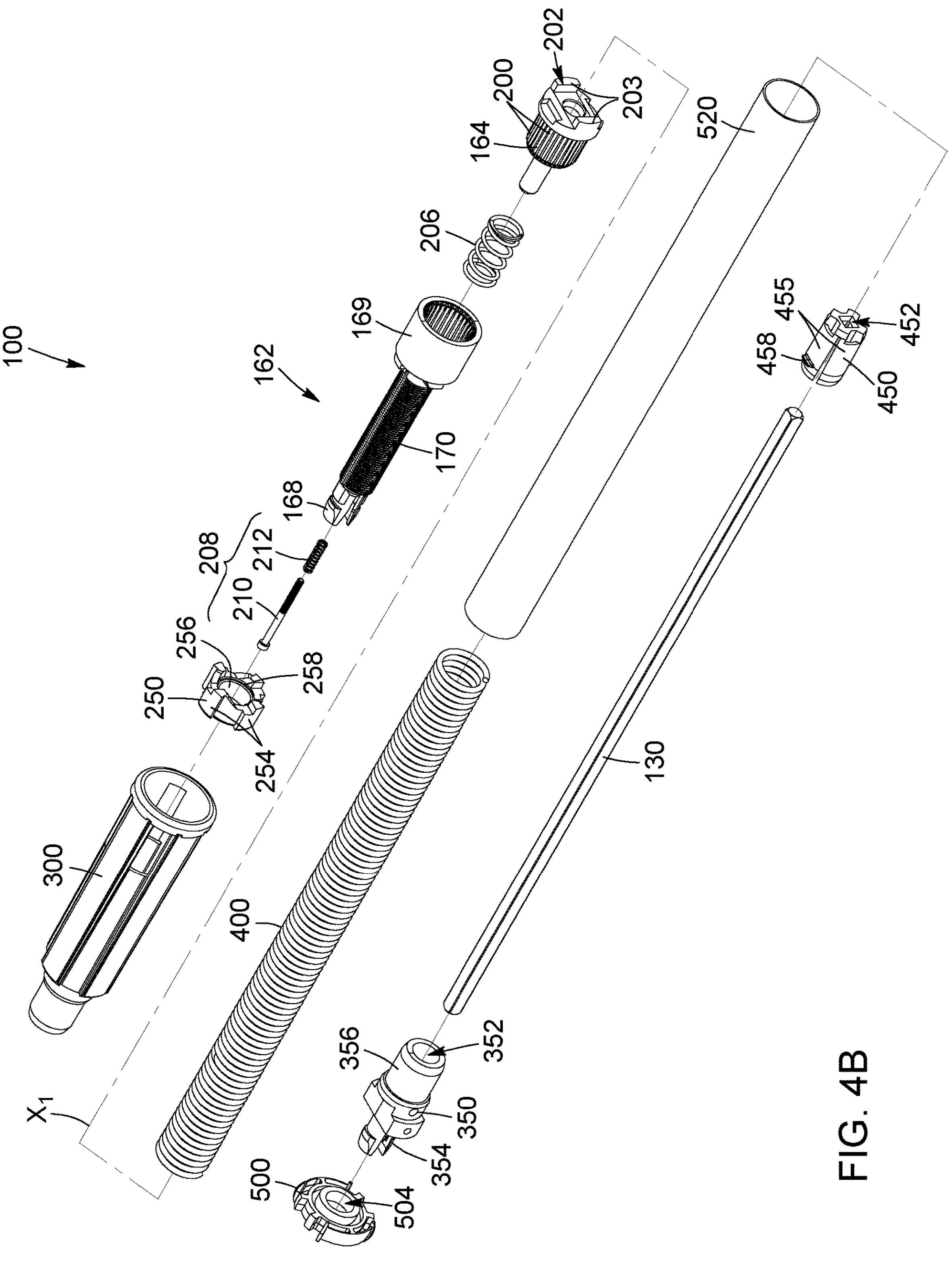
Figure 5:
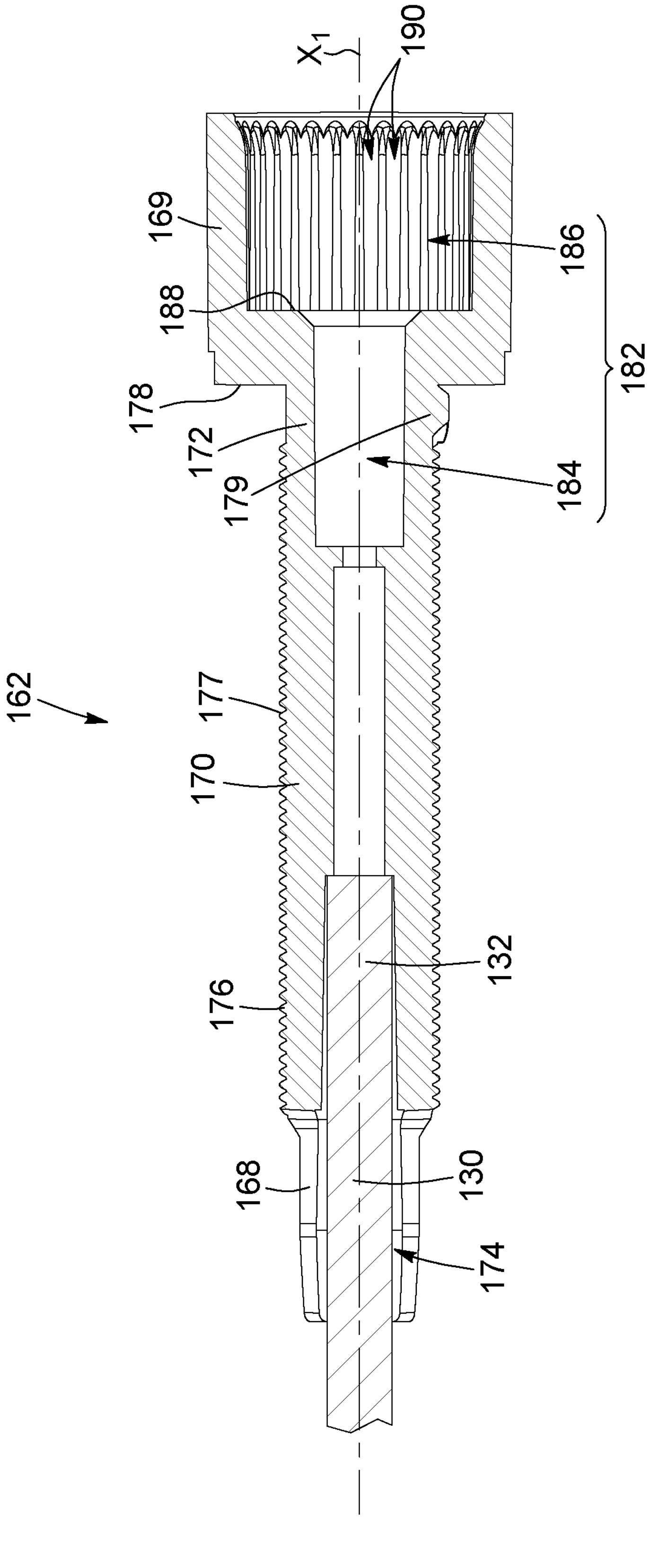
FIG. 5 is a cross-section view of a limit screw of the roller blind limiter assembly of FIG. 3 engaged with a coupling shaft.

With reference in particular to FIGS. 4A, 4B and 5, the body 162 (or limit screw 162, or threaded screw 162) extends along the first axis X1 (or longitudinal axis X1) and comprises a bearing sleeve-engaging portion 168 at a distal end thereof, a proximal end 169 (or proximal portion 169), the spindle portion 170 (or threaded spindle 170) extending between the bearing sleeve-engaging portion 168 and the proximal end portion 169. The stroke portion 172 (or winding stopper 172) is located between the threaded spindle 170 and the proximal end portion 169.

In the following description, unless otherwise stated, the terms proximal and distal should be understood with regards to the roller blind support or to the holding element, for instance with regards to the roller blind-supporting bracket 80 with which the roller blind mechanism 100 is engageable in the embodiment shown (i.e. to which the roller blind mechanism is mountable, for instance via the support-engaging member 164).

The bearing sleeve-engaging portion 168 comprises flexible tongues with a shaft receiving-cavity 174 at least partially formed therebetween. The shaft-receiving cavity 174 also extends at least partially in the threaded spindle 170 and is dimensioned, as represented in FIG. 5, to receive a first end portion 132 (or proximal end portion 132) of the coupling shaft 130.

The threaded spindle 170 has a substantially cylindrical shape extending along the first axis X1 and has an outer surface on which a thread 176 is formed.

The proximal portion 169 of the limit screw 162 has a substantially cylindrical shape extending along the first axis X1 with a cross-section greater than a cross-section of the threaded spindle 170, so that a screw shoulder 178 is formed between the threaded spindle 170 and the proximal end portion 169. As represented in FIG. 5, the screw shoulder 178 comprises the winding stopper 172.

An adjuster-receiving cavity 182 (or engagement member-receiving cavity 182) is formed in the proximal portion 169 and the threaded spindle 170, extending along the first axis X1. The adjuster-receiving cavity 182 (or engagement member-receiving cavity 182) comprises a distal portion 184 partially extending in the threaded spindle 170 and opening out in the shaft-receiving cavity 174, and a proximal portion 186 formed in proximal end portion 169 of the limit screw 162 and opening out at the proximal end thereof. The proximal portion 186 has a cross-section greater than a cross-section of the distal portion 184 so that a spring-receiving surface 188 is formed that partially surrounds the distal portion 184.

The proximal portion 186 has a plurality of longitudinal grooves 190 (i.e. extending along directions substantially parallel to the first axis X1) formed on an inner surface thereof.

Figure 30:
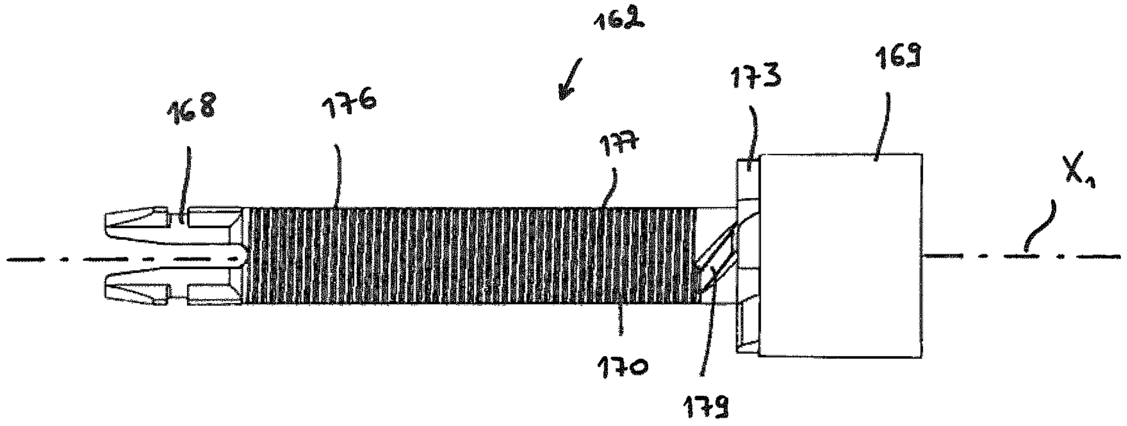
FIG. 30 is a side elevation view of the limit screw of FIG. 5.

As best shown in FIG. 30, the thread 176 of the limit screw 162 varies along the longitudinal axis X1. In other words, the limit screw 162 comprises a variable screw thread along the threaded spindle 170. In the shown embodiment, the limit screw 162 comprises an increasing screw thread along the threaded spindle 170 toward the winding stopper 172. In other words, the thread 176 comprises a distal thread portion 177 smaller than a proximal thread portion 179.

Moreover, as represented in FIG. 4A, in the embodiment shown, the winding stopper 172 comprises a plurality of stopping surfaces 173. For instance, the plurality of stopping surfaces 173 of the winding stopper 172 are equidistantly and coaxially distributed around the longitudinal axis X1. In the embodiment shown, the winding stopper 172 comprises four stopping surfaces 173.

It is appreciated that the shape and the configuration of the limit screw 162, as well as the shape, the configuration and the location of its different cavities can vary from the embodiment shown. Moreover, the shape, the configuration and the location of the winding stopper (for instance the shape, dimensions and number of the stopping surfaces thereof), as well as the shape, the configuration and the location of the thread (for instance the shape, dimensions and number of the threaded portions thereof) can vary from the embodiment shown.

Figure 21A:
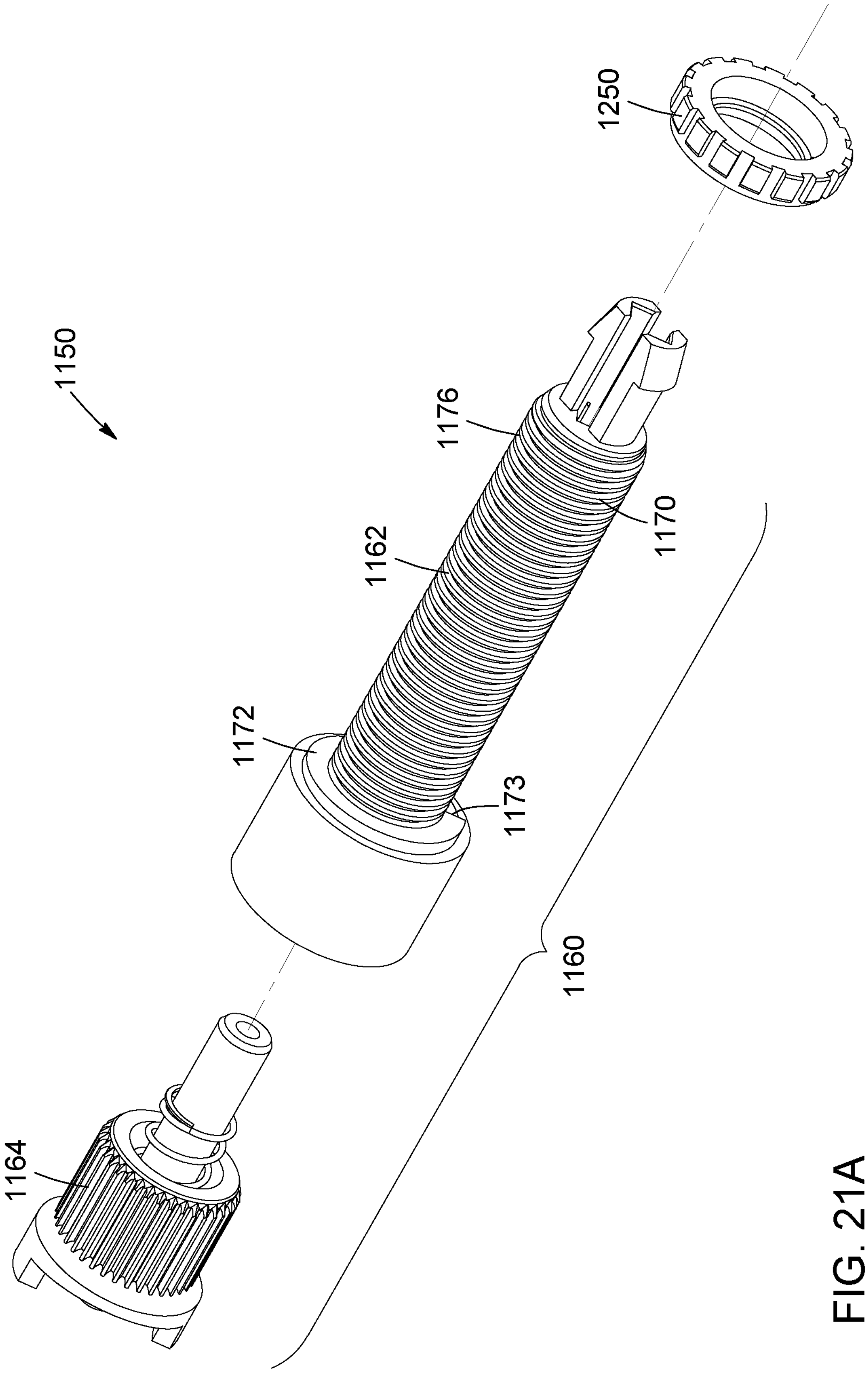
FIGS. 21A and 21B are respective right and left perspective views, exploded, of a roller blind limiter assembly in accordance with another embodiment.
Figure 21B:
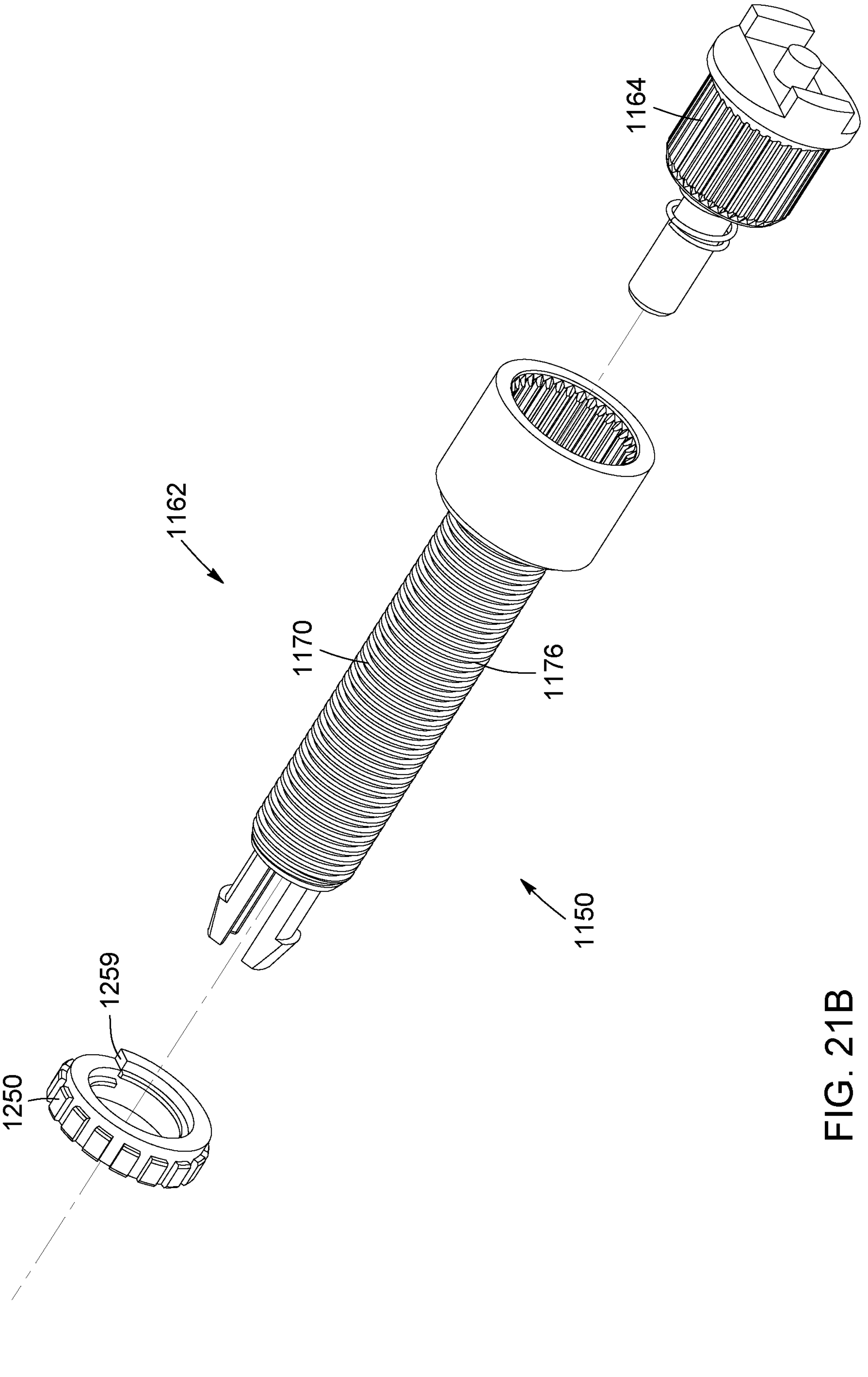

For instance, FIGS. 21A and 21B represent another possible embodiment of a roller blind limiter assembly 1150 comprising a roller blind-stopping system 1160 with a limit screw 1162 and a support-engaging member 1164. In the embodiment shown, the thread 1176 does not vary along the threaded spindle 1170. Moreover, the winding stopper 1172 comprises one single stopping surface 1173.

Support-Engaging Member/Angular Position Adjuster

As represented in FIGS. 4A, 4B, 6, 7A and 7B, the angular position adjuster 164 (or support-engaging member 164) comprises a spring-receiving rod 192 at a distal end thereof, a bracket-mounting portion 194 (or holding portion 194) at a proximal end thereof, and an adjuster body 196 extending between the spring-receiving rod 192 and the bracket-mounting portion 194. The adjuster body 196 and the spring-receiving rod 192 form together at least partially a screw-coupling portion 195. As detailed below, the screw-coupling portion 195 is at least partially engageable in the engagement member-receiving cavity 184 of the limit screw 162 at least when the roller blind limiter assembly 150 is configured in the locked configuration.

The spring-receiving rod 192 extends along the first axis X1 (or longitudinal axis X1) and comprises a locker-receiving cavity 198 (or fastener-receiving cavity 198) (FIG. 6) formed therein and opening out at the distal end of the angular position adjuster 164. The spring-receiving rod 192 is partially surrounded, along an axial portion thereof, by the adjuster body 196.

As represented in FIGS. 4A and 4B, the adjuster body 196 has a plurality of longitudinal grooves 200 (extending along a direction substantially parallel to the first axis X1) formed on an outer surface thereof, and dimensioned to cooperate with the plurality of longitudinal grooves 190 of the body 162 (or limit screw 162), so as to prevent the support-engaging member 164 from pivoting with regards to the limit screw 162 about the first axis X1 upon rotation of the support-engaging member 164 about the first axis X1, when the roller blind limiter assembly 150 is configured in the locked configuration. In other words, the longitudinal grooves 200, 190 conform with each other so as to angularly couple together the body 162 and the angular position adjuster 164 upon rotation of the angular position adjuster 164 about the first axis X1 when the roller blind limiter assembly 150 is configured in the locked configuration.

In the embodiment shown, the bracket-mounting portion 194 (or holding portion 194) has a bracket-mounting face extending in a direction substantially perpendicular to the first axis X1. Mounting portions 202 (comprising in the embodiment shown a central cylindrical portion surrounded by two lateral mounting tongues 203 or support-mounting tabs 203) are formed on the bracket-mounting face 204 that are insertable, as represented in FIG. 12, in corresponding tab-receiving openings 82 formed in the roller blind-supporting bracket 80 to fixedly mount the angular position adjuster 164 to the roller blind-supporting bracket 80. In other words, the one or more support-mounting tabs 203 of the support-engaging member 164 are engageable (either directly or indirectly) with the roller blind support. In the embodiment shown, the roller blind support comprises the roller blind-supporting bracket 80 having the first tab-receiving openings 82 substantially horizontally aligned with each other. The roller blind-supporting bracket 80 also comprises second tab-receiving openings 84 substantially vertically aligned with each other and shaped and dimensioned to receive the support-mounting tabs 203. It is thus understood that the roller blind-supporting bracket 80 is configured so that the support-engaging member 164 can be mounted in two possible ways to the roller blind-supporting bracket 80, the two ways being rotated with respect to each other from about 90 degrees.

It is appreciated that the shape, the configuration, and the location of the roller blind-supporting bracket 80 can vary from the embodiment shown. Moreover, it could be conceived any other ways to engage the roller blind mechanism 100 to a holding support.

Figure 6:
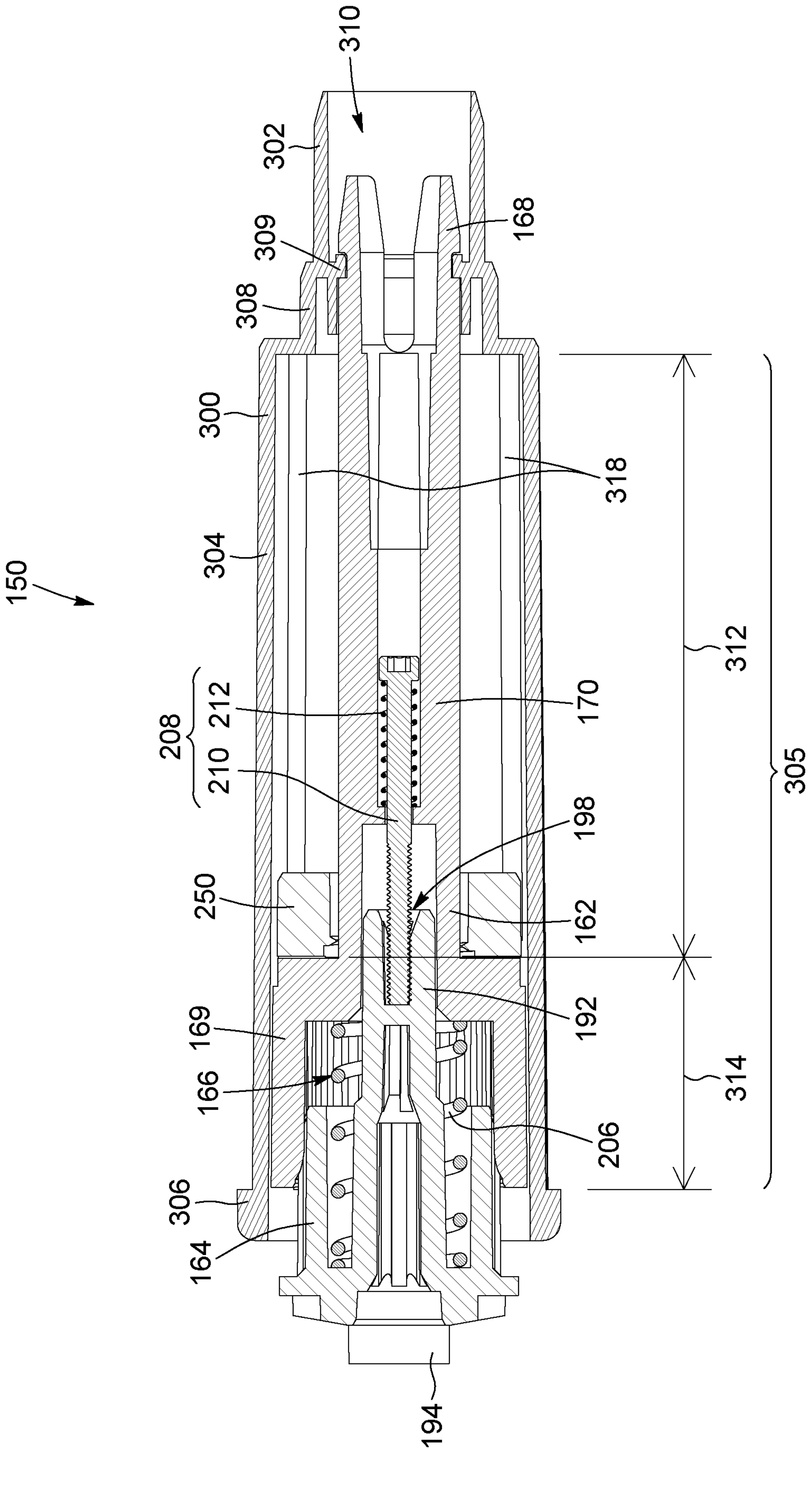
FIG. 6 is a cross-section view of the roller blind limiter assembly of FIG. 3 inserted in a bearing sleeve.

A tension spring 206 (or support engagement-biasing member 206), as represented in FIG. 6, is arranged around the spring-receiving rod 192 of the support-engaging member 164, abutting against the spring-receiving surface 188 of the limit screw 162 to resiliently maintain the mounting portions 202 (for instance the support-mounting tabs 203) in the corresponding openings formed in the roller blind-supporting bracket 80, so as to ensure the mounting (or the engagement) of the roller blind mechanism 100 onto the roller blind-supporting bracket 80 via the support-engaging member 164. In other words, the support engagement-biasing member 206 extends at least partially in the engagement member-receiving cavity 182 of the limit screw 162 and is shaped and dimensioned to bias the support-engaging member 164 toward the roller blind support (for instance toward the roller blind-supporting bracket 80) when in use (i.e. when the roller blind limiter assembly 150 is configured in the locked configuration).

It is appreciated that the shape and the configuration of the angular position adjuster 164, as well as the shape, the configuration and the location of the screw-coupling portion 195, the spring-receiving rod 192, the adjuster body 196 and the bracket-mounting portion 194 (or holding portion 194) can vary from the embodiment shown.

Figure 13:
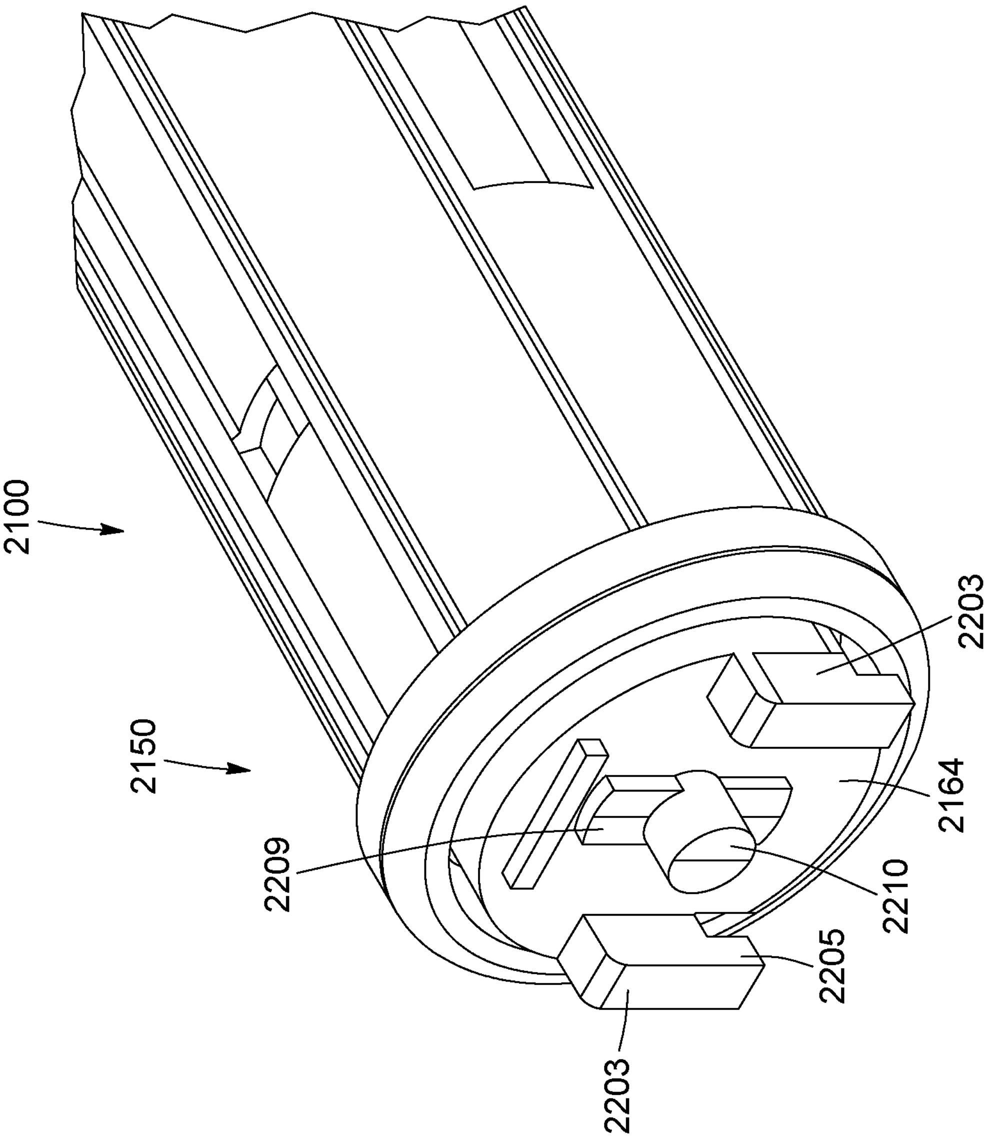
FIG. 13 is a sectioned perspective view of a roller blind mechanism in accordance with another embodiment, the roller blind mechanism being of the free-lift type and comprising a roller blind limiter assembly.
Figure 15:
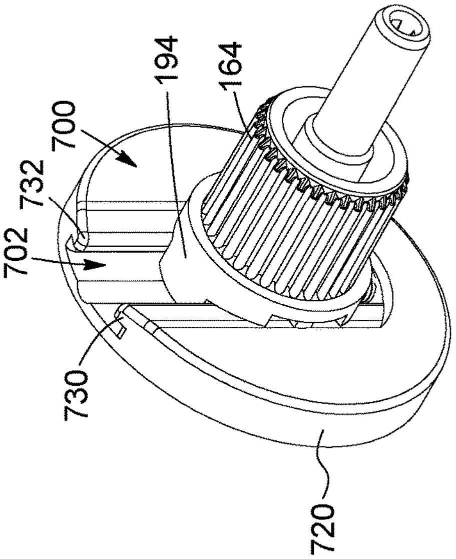
FIG. 15 is a front perspective of a mechanism-levelling system, a support-engaging member of a roller blind limiter assembly being engaged therewith.
Figure 16:
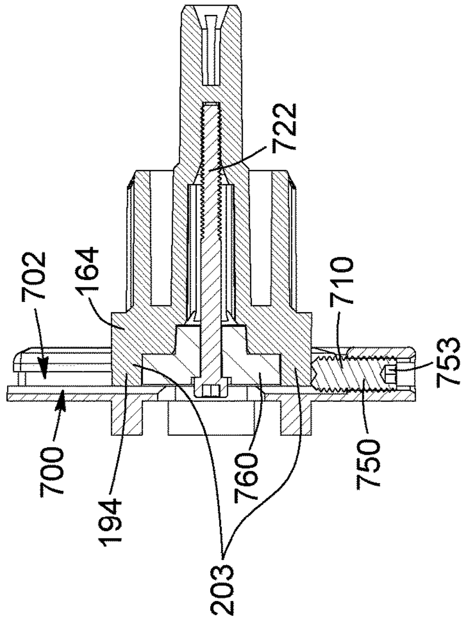
FIG. 16 is a cross-section view of the mechanism-levelling system of FIG. 15.
Figure 14:
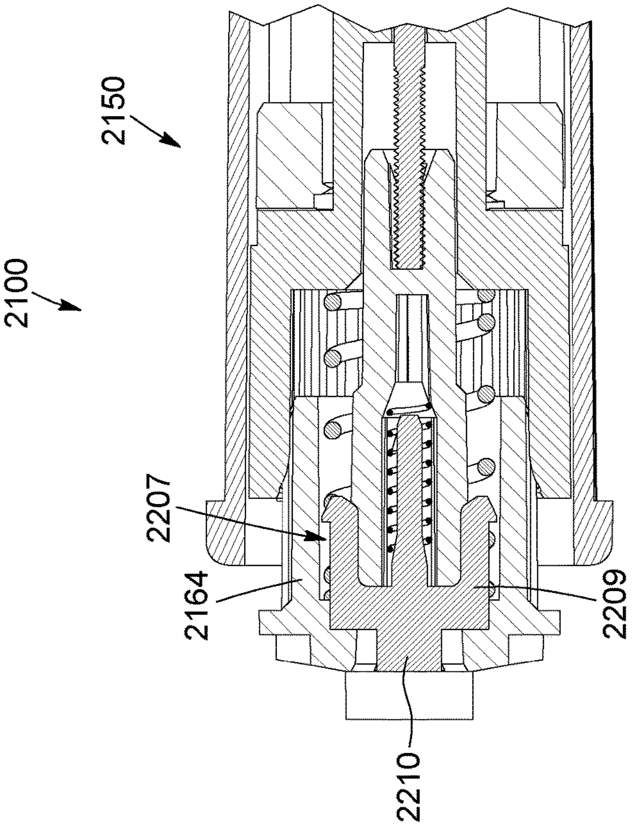
FIG. 14 is a cross-section view of the roller blind limiter assembly of FIG. 13.

For instance, FIGS. 13 and 14 represent another possible embodiment of the support-engaging member 2164 of the roller blind mechanism 2100. In the embodiment shown, the support-engaging member 2164 of the roller blind limiter assembly 2150 is shaped and dimensioned to be used with a roller blind system comprising no actuation rods; such roller blind systems, wherein the blind is extendable and/or retractable upon direct cooperation of the user with the blind or with the roller blind tube to which the blind is mounted, are usually known as free lift blinds.

As represented in FIGS. 13 and 14, the support-mounting tabs 2203 comprise support-mounting hooks 2205 engageable with the roller blind support (not represented). Moreover, in the embodiment shown, a rod-receiving cavity 2207 is formed in the support-engaging member 2164. The support-engaging member 2164 further comprises a support-mounting rod 2209 resiliently engaged in the rod-receiving cavity 2207 and biased toward the roller blind support when in use. In the embodiment shown, the support-mounting rod 2209 has a substantially trident-shape and comprises a support-mounting head 2210 (for instance substantially cylindrical in shape) that is insertable into a corresponding aperture formed in the roller blind support.

Limiter-Locking Assembly

As mentioned above, the limiter-locking assembly 166 firstly comprises the conforming longitudinal grooves 190, 200 preventing the rotation of the angular position adjuster 164 (or support-engaging member 164) with regards to the limit screw 162 upon rotation of the angular position adjuster 164 about the longitudinal axis X1 when the roller blind limiter assembly 150 is in the locked configuration. In other words, the limiter-locking assembly 166 comprises angular couplers 190, 200 angularly coupling together the limit screw 162 and the support-engaging member 164 when the roller blind limiter assembly 150 is configured in the locked configuration The limiter-locking assembly 166 further comprises, as represented in FIG. 6, a resilient fastener 208 biasing the limit screw 162 and the support-engaging member 164 toward each other along the longitudinal axis X1 when the roller blind limiter assembly 150 is configured in the locked configuration. The resilient fastener 208 is thus shaped and dimensioned to mechanically connect the limit screw 162 and the support-engaging member 164. In the embodiment shown, the resilient fastener 208 comprises a fastener 210 (such as a screw or any other suitable fastener) secured to the angular position adjuster 164 (for instance engaged into the fastener-receiving cavity 198 formed therein), and further extending in a proximal portion of the shaft-receiving cavity 174 of the limit screw 162. The resilient fastener 208 further comprises a spring 212 surrounding the portion of the fastener 210 extending in the shaft-receiving cavity 174. The resilient fastener 208 is also shaped and dimensioned to connect the limit screw 162 and the support-engaging member 164 together when the roller blind limiter assembly 150 is configured in the unlocked configuration.

Figure 9:
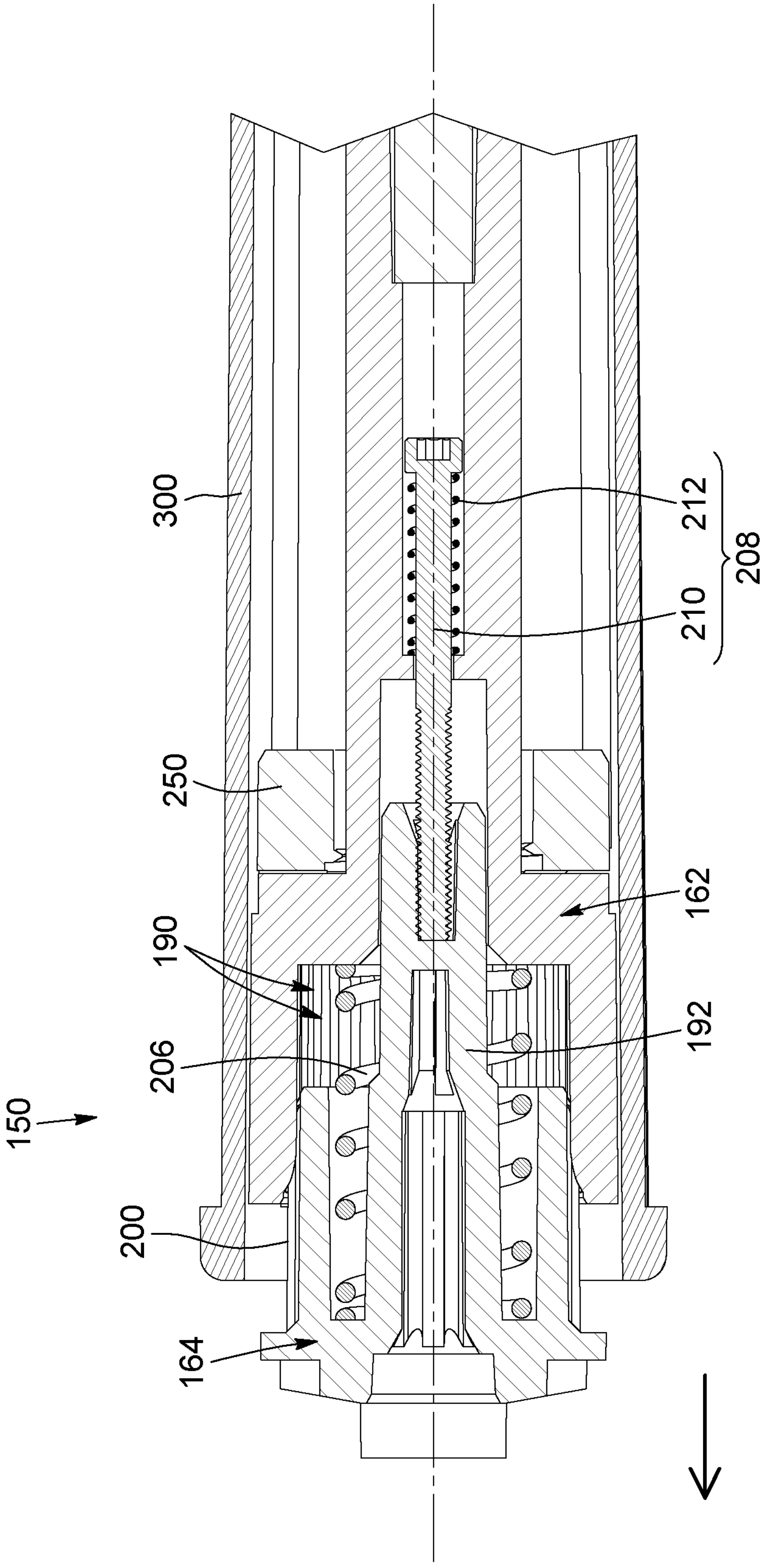
FIG. 9 is an enlarged cross-section view of the roller blind limiter assembly of FIG. 3 in a locked configuration.
Figure 10:
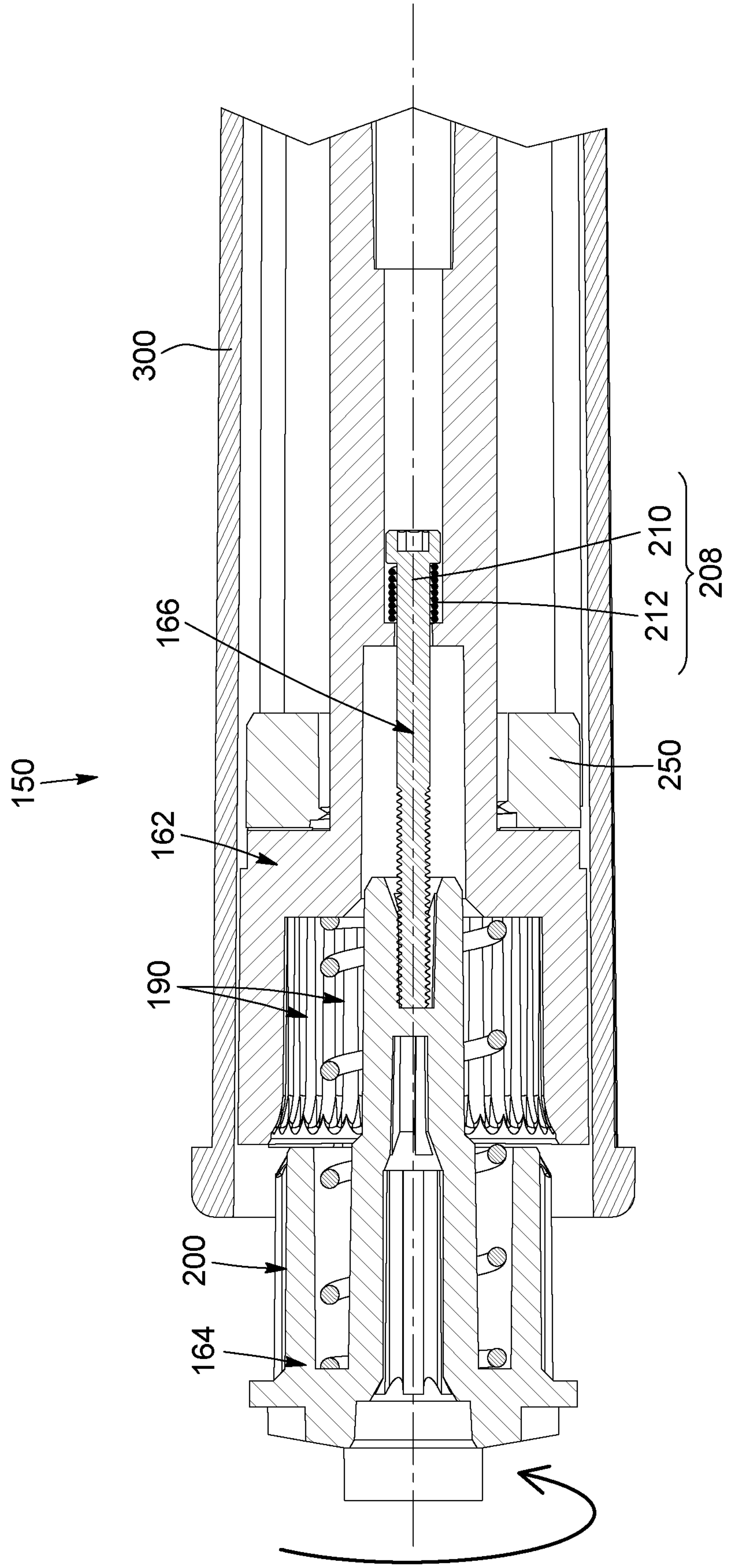
FIG. 10 is an enlarged cross-section view of the roller blind limiter assembly of FIG. 3 in an unlocked configuration.
Figure 11:
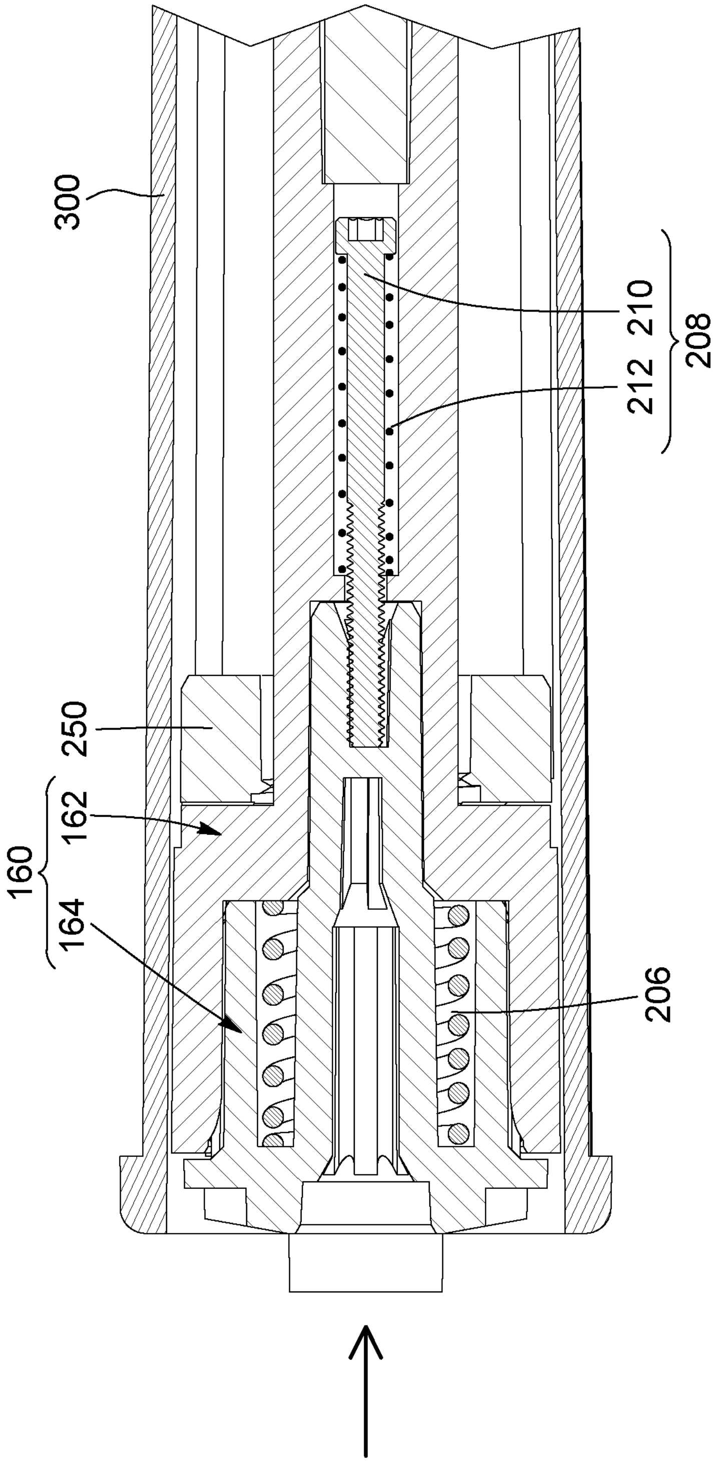
FIG. 11 is an enlarged cross-section view of the roller blind limiter assembly of FIG. 3, a support-engaging member thereof being in a compressed configuration.

Referring to FIGS. 9 to 11, it is understood that the roller blind-stopping system 160 of the roller blind limiter assembly 150 is configured to adjust the angular position of the roller blind mechanism 100 with regards to the roller blind support—for instance with regards to the roller blind-supporting bracket 80 when mounted to the roller blind support via the roller blind-supporting bracket 80—for instance to adjust the position of the weight bar 58, when the roller blind tube assembly 50 is in one of the wound and unwound configurations. In other words, the roller blind-stopping system 160 is configured to modify at least one of the upper and lower end positions of the roller blind. In other words, in the embodiment shown, the limit screw 162 is connectable to the holding element—or the roller blind support—in any one of a plurality of different orientations relative to the holding element via the support-engaging member 164.

To this end, the roller blind assembly 100 has firstly to be removed from the roller blind support—for instance from the roller blind supporting-bracket 80. Then, a longitudinal force—along the first axis X1—should be applied outwardly to the support-engaging member 164 (with regards to the mechanism-receiving cavity 54 or with regards to the engagement member-receiving cavity 182 formed in the threaded spindle 170), as represented in FIG. 9, to configure the roller blind limiter assembly 150 in the unlocked configuration in which the longitudinal grooves 190, 200 are axially spaced apart from each other. It is to be noted that, when the roller blind limiter assembly 150 is configured in the unlocked configuration, as represented in FIG. 10 and as mentioned above, the angular position adjuster 164 is not entirely separated from the limit screw 162, due, in the embodiment shown, to the above-described resilient fastener 208.

Then, when the roller blind limiter assembly 150 is configured in the unlocked configuration, as represented in FIG. 10, the angular position adjuster 164 can be rotated about the longitudinal axis X1 with regards to the body 162 until an angular position corresponding to the desired vertical position of the blind (i.e. corresponding to the desired upper or lower end position of the blind) is reached.

When the longitudinal force applied to the angular position adjuster 164 is stopped, the angular position adjuster 164 is engaged again in engagement member-receiving cavity 182 of the limit screw 162, for the roller blind-stopping system 150 to be configured again in the locked configuration.

For the roller blind mechanism 100 to be supported again by the roller blind support (for instance by the roller blind-supporting bracket 80), a longitudinal force—along the first axis X1—should be applied inwardly to the angular position adjuster 164, as represented in FIG. 11, to configure the support-engaging member 164 in a compressed configuration in which the mounting face 204 of the support-engaging member 164 is arranged in front of a corresponding mounting face of the roller blind support, for the mounting portions 202 (comprising for instance the support-mounting tabs 203) to be inserted into the corresponding openings formed in the roller blind-supporting bracket 80 when the inward longitudinal force is stopped.

In other words, the present disclosure also concerns a method for adjusting at least one of the winding and the unwinding positions of a roller blind system 10 comprising a roller blind tube 52 with a blind 56 mounted thereto, and a roller blind mechanism 100 (i.e. a method for adjusting at least one of the retracted and the extended positions of the roller blind, i.e. a method for adjusting a vertical position of a weight bar of the blind or of a lower portion of the blind thereof, when the roller blind tube assembly 50 is in the corresponding one of the wound and unwound configurations). The method thus comprises providing a roller blind system 10 comprising a roller blind tube 52 defining a mechanism-receiving cavity 54, a blind 56 mounted to the roller blind tube 52 and a roller blind mechanism 100 according to the present disclosure, the roller blind mechanism 100 being inserted in the mechanism-receiving cavity. The method further comprises configuring the roller blind limiter assembly 150 into the unlocked configuration, pivoting the angular position adjuster 164 with regards to the body 162 of the abutting assembly 162 about the longitudinal axis X1 and configuring the roller blind limiter assembly 150 back into the locked configuration.

In other words, the present disclosure also concerns a method 600 for adjusting an end position of a roller blind 56. The method 600 comprises a step 610 of providing a roller blind system 10 comprising a roller blind tube 52 defining a mechanism-receiving cavity 54 and having a longitudinal axis X1; a blind 56 mounted to the roller blind tube 52 and extendable and retractable between upper and lower end positions; and a roller blind mechanism 100 inserted into the mechanism-receiving cavity 54. In the embodiment shown, the roller blind mechanism 100 comprises a roller blind limiter assembly 150 with a support-engaging member 164 mountable to a roller blind support, a limit screw 162 comprising a threaded spindle 170 and a winding stopper 172 and a limit nut 250 threadedly engaged with the threaded spindle 170 of the limit screw, operatively connectable to the roller blind tube 52 and travelling along the threaded spindle 170 upon extension and retraction of the blind 56. The method further comprises a step 620 of configuring the roller blind limiter assembly 150 in an unlocked configuration, a step 630 of pivoting the support-engaging member 164 about the longitudinal direction X1 with respect to the limit screw 162; and a step 640 of configuring the roller blind limiter assembly 150 in a locked configuration wherein the limit screw 162 is fixedly mountable to the roller blind support via the support-engaging member 164.

In the embodiment shown, the limit screw comprises 162 a proximal portion 169 with an engagement member-receiving cavity 182 formed therein and the support-engaging member 164 comprises a screw-coupling portion 195 at least partially engageable in the engagement member-receiving cavity 182 at least when the roller blind limiter assembly 150 is in the locked configuration, wherein the method 600 further comprises axially (i.e. along a direction substantially parallel to the longitudinal axis X1) displacing the support-engaging member 164 within the engagement member-receiving cavity 182; and disengaging the roller blind system 10 from the roller blind support.

In the embodiment shown, the method 600 further comprises pivoting the roller blind tube about the longitudinal direction to abut the limit nut 250 against the winding stopper 172 prior to the step 620 of configuring the roller blind limiter assembly 150 in the unlocked configuration. It is understood that, in case the limit nut 250 would not abut the winding stopper 172 prior to the step 620 of configuring the roller blind limiter assembly 150 in the unlocked configuration, the roller blind mechanism 100 in the embodiment shown is configured (in particular due to the below-described helical torsion spring) to automatically displace the limit nut 250 along the limit screw 162 until the limit nut 250 abuts the winding stopper 172 once the roller blind limiter assembly 150 is configured in the unlocked configuration (i.e. once the roller blind mechanism 100 is disengaged from the roller blind support).

It is appreciated that the shape and the configuration of the limiter-locking assembly 166 can vary from the embodiment shown.

Limit Nut/Stopper/Stop Nut

Figure 7A:
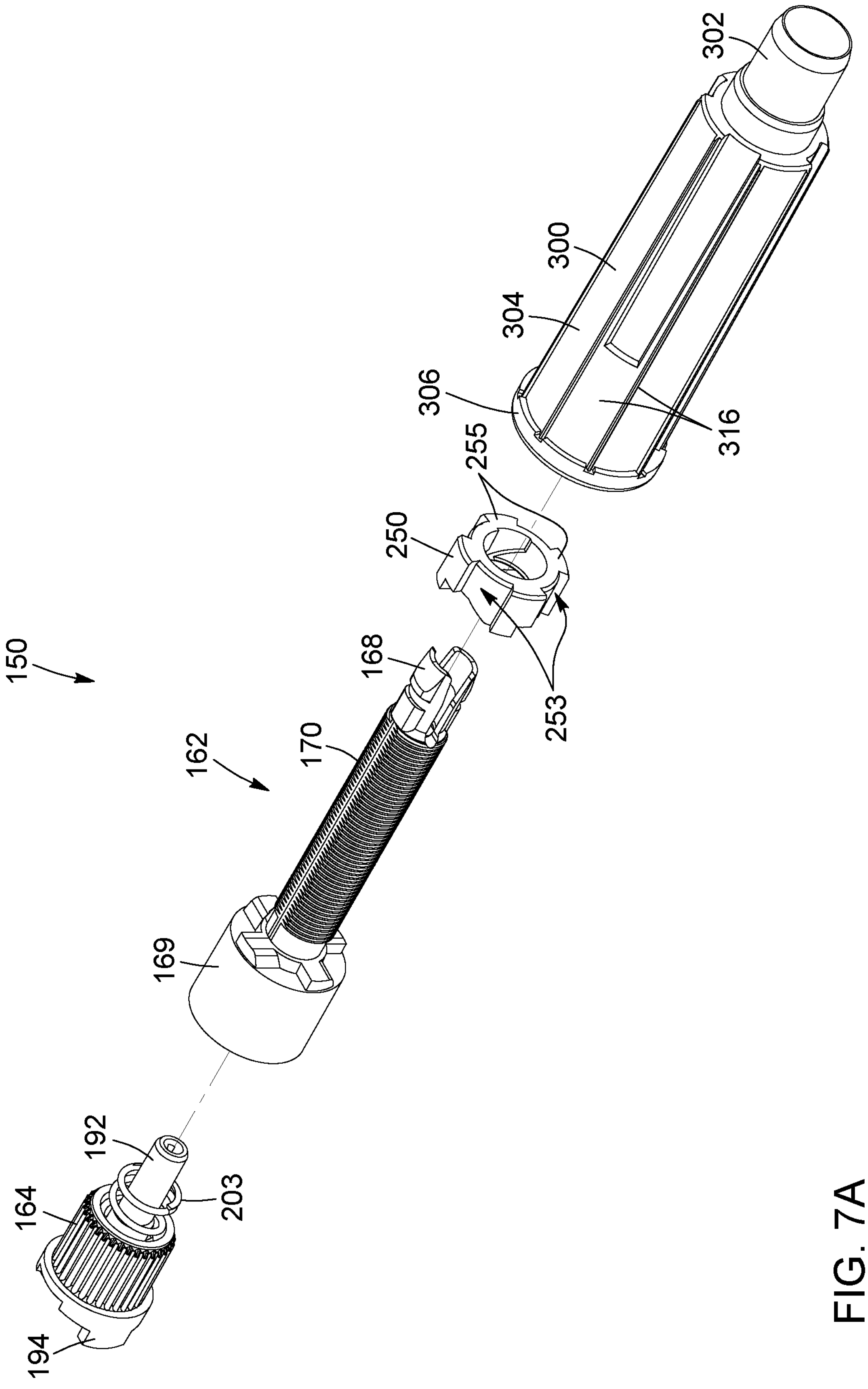
FIGS. 7A and 7B are respective right and left perspective views, exploded, of the roller blind limiter assembly and the bearing sleeve of FIG. 6.

As represented for instance in FIGS. 4A, 4B, 31A and 31B, the limit nut 250 (or stopper 250, or stop nut 250) of the roller blind limiter assembly 150 has a substantially cylindrical shape extending along the longitudinal axis X1. The stopper 250 comprises an outer surface 252 with a plurality of coupling angular couplers 254 formed thereon. In the embodiment shown, as best represented in FIG. 7A, the angular couplers 254 comprise angular coupling indentations 253 and angular coupling protrusions 255 extending outwardly in a radial direction from the outer surface 254 of the limit nut 250. As detailed below, the angular couplers 254 are shaped and dimensioned to angularly couple—either directly or indirectly—the limit nut 250 with the roller blind tube 52 when in use (i.e. upon rotation of the roller blind tube 52 about the longitudinal axis X1).

Figure 31A:
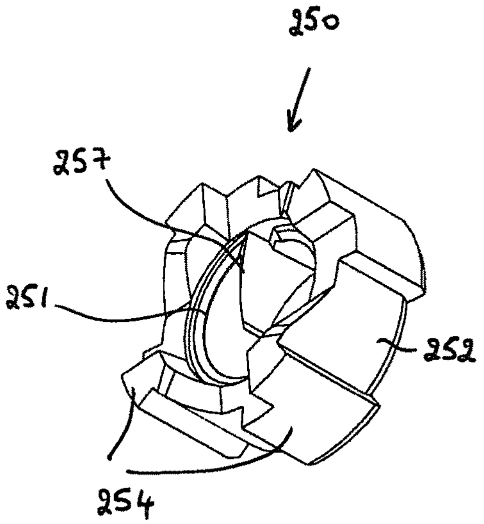
FIGS. 31A and 31B are respective proximal and distal perspective views of the limit nut of FIGS. 8A and 8B.
Figure 31B:
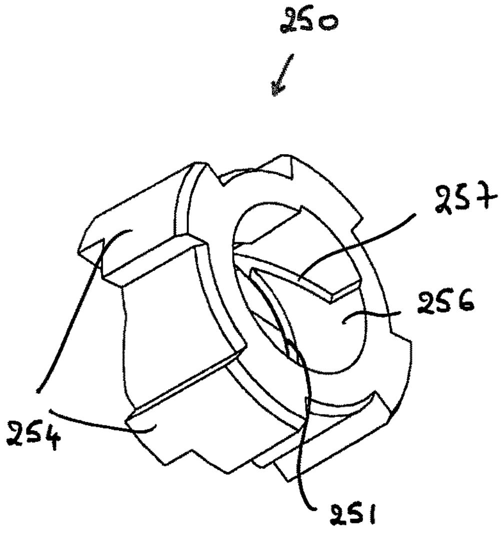

Moreover, the stopper 250 comprises an inner surface 256 on which a thread 258 is formed (FIG. 4B). The thread 258 is shaped and dimensioned to conform to the thread 176 formed on the outer surface of the threaded spindle 170 of the limit screw 162 for the limit nut 250 to be displaceable along the threaded spindle 170 in a worm-drive type cooperation. As best shown in FIGS. 31A and 31B, and similarly to the above-described limit screw 162, the thread 258 formed on the inner surface 256 of the stopper 250 comprises a distal thread portion 257 and a proximal thread portion 251, the distal thread portion 257 being greater than the proximal thread portion 251. The distal thread portion 257 and the proximal thread portion 251 of the limit nut 250 are shaped and dimensioned to cooperate respectively with the proximal thread portion 179 and the distal thread portion 177 of the limit screw 162.

Figure 7B:
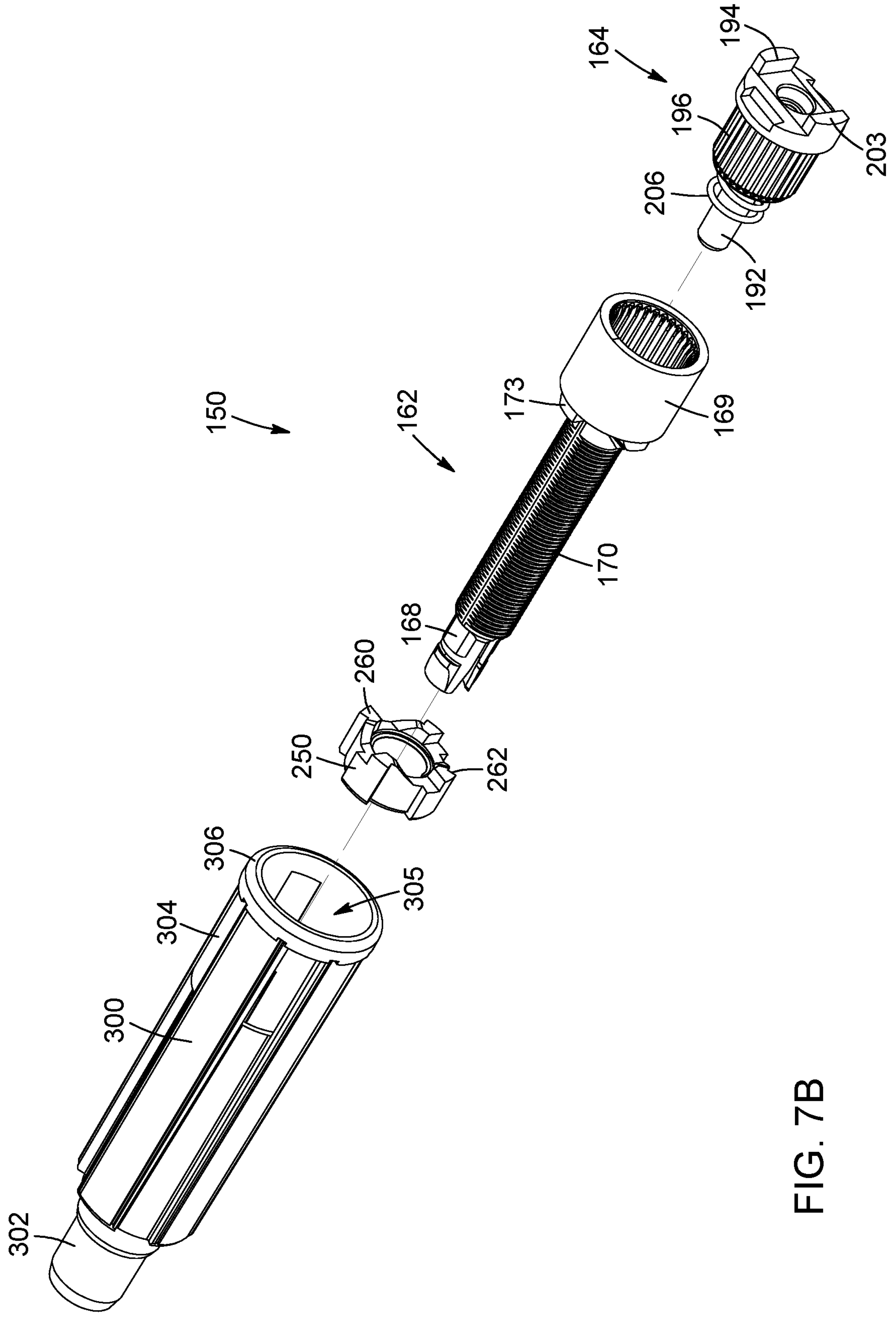

As represented in FIG. 7B, a winding stopper portion 260 is further formed on a proximal side 262 of the stopper 250.

The stopper 250 is configured to be rotated about the first axis X1 when the roller blind tube 52 is rotated about the first axis X1 for the blind 56 to be configured from one of the wound and unwound configurations to the other. As represented in FIG. 8A, when the blind 56 is configured into the unwound configuration (i.e. when the blind 56 is configured, for instance via actuation of the actuator 60, into the extended configuration or into any intermediate configuration between the retracted and extended configurations), the stopper 250 is inwardly displaced (with regards to the mechanism-receiving cavity 54) with regards to the winding stopper 172 of the roller blind stopping system 160. In other words, the stopper 250 is displaced along the threaded spindle 170 away from the winding stopper 172.

When the roller blind system 10 is actuated for the blind 56 to be configured into the wound configuration (i.e. when the blind 56 is configured into the retracted configuration or into any intermediate configuration between the retracted and extended configurations), the stopper 250 is displaced with regards to the winding stopper 172 of the roller blind-stopping system 160 towards the support-engaging member 164, until the winding stopper portion 260 of the limit nut 250 abuts against the winding stopper 172 of the roller blind-stopping system 160, so as to stop the winding of the blind. In other words, the limit nut 250 is displaced along the threaded spindle 170 until the winding stopper portion 260 contacts the winding stopper 172 of the limit screw 170, as represented in FIG. 8B.

Figure 8B:
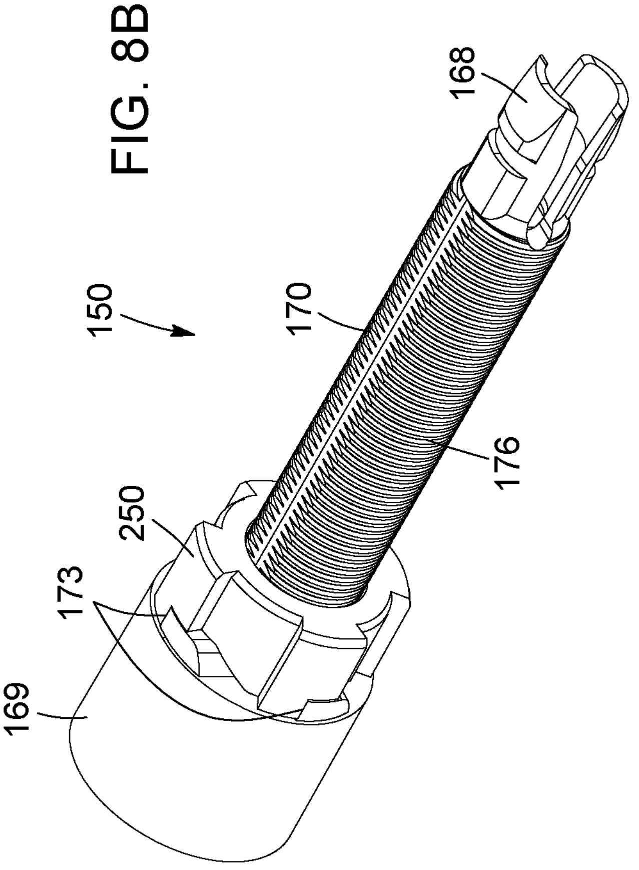
FIGS. 8A and 8B are front perspective views of the roller blind limiter assembly of FIG. 3, a limit nut being respectively in intermediate and abutting positions with respect to the limit screw.
Figure 8A:
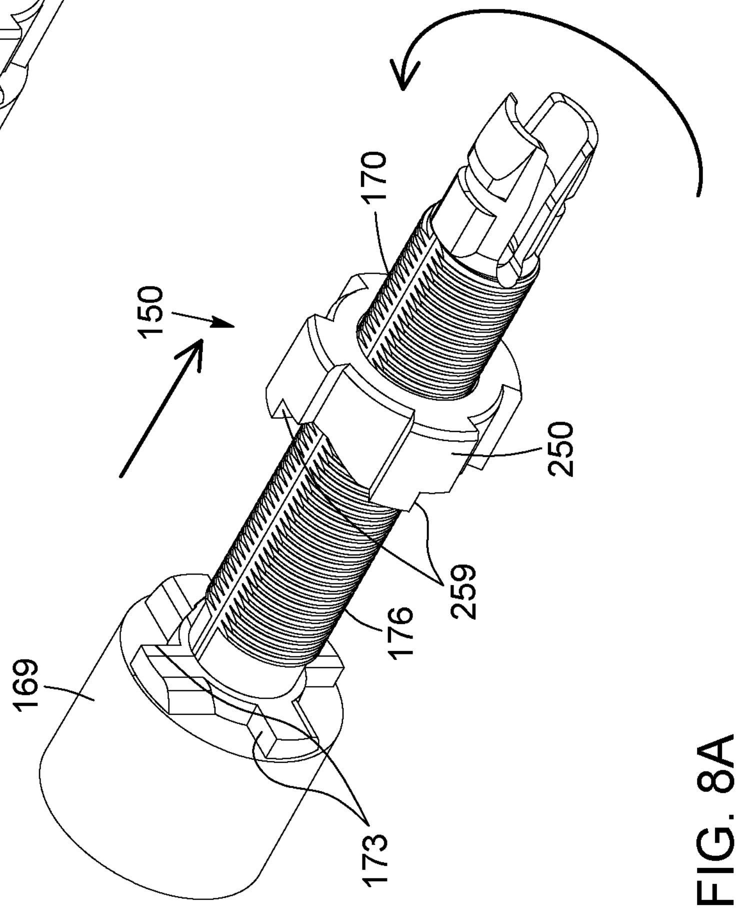

In the embodiment shown, as represented for instance in FIGS. 8A and 8B, the limit nut 250 comprises a plurality of stopping surfaces 259 corresponding substantially to the plurality of stopping surfaces 173 (four, in the embodiment shown) of the winding stopper 172 of the limit screw 162. In other words, the limit nut 250 engageable with the limit screw 162 and the limit nut 250 stops rotating, so as to provide an effective stop for the blind, which can no longer move upwards, in the embodiment shown. The shape, number, dimensions and arrangement of the stopping surfaces 259, 176 are configured to provide a strong and efficient stopping of the winding of the blind 56.

First, it is understood that the variable screw thread of the limit screw 162 (and the corresponding variable screw thread of the limit nut 250) makes it possible, due to the fine thread portion of the limit screw and the limit nut, to allow a significant number of rotations of the roller blind tube 52 when the blind 56 is configured from one of the upper and lower end positions to the other one of the upper and lower end positions. In other words, the providing of a fine thread portion on the limit screw and the limit nut makes it possible to limit the dimensions of the roller blind limiter assembly even when used in a roller blind system of significant dimensions (i.e. in a roller blind system wherein a significant number of roller blind tube rotations—for instance of the order of several dozens—are done when the blind is configured from one of the upper and lower end positions to the other one of the upper and lower end positions).

Second, it is understood that the variable screw thread of the limit screw 162 (and the corresponding variable screw thread of the limit nut 250) makes it possible, due to the bigger thread portion of the limit screw and the limit nut, to provide a strong end position of the blind (i.e. a strong cooperation of the limit nut with the winding stopper of the limit screw). In some embodiments, the proximal thread portion 179 of the limit screw 162 (and the corresponding distal thread portion 257 of the limit nut 250) is greater than about ¼ in. In some other embodiments, the proximal thread portion 179 of the limit screw 162 (and the corresponding distal thread portion 257 of the limit nut 250) is of the order of about ½ in. In some embodiments, the stopping surfaces 173 of the winding stopper 172 are greater than about 1/16 in. In some other embodiments, the stopping surfaces 173 of the winding stopper 172 are of the order of ⅛ in. In other words, the variable threads of the limit screw 162 and the limit nut 250 are thus shaped and dimensioned to provide significant contact surfaces between the limit nut and the winding stopper (divided into one or more stopping surfaces) and to limit the dimensions of the roller blind limiter assembly.

It is appreciated that the shape and the configuration of the stopper 250 can vary from the embodiment shown, as well as the shape, the configuration and the location of the different thread portions from on the inner surface thereof, the angular couplers 254 and the winding stopper portion 260. Moreover, the shape, dimensions and number of the stopping surfaces of the limit nut, as well as the shape, the configuration and the location of the inner thread can vary from the embodiment shown. For instance, in the embodiment of the roller blind limiter assembly 1150 represented in FIGS. 21A and 21B, the limit nut 1250 comprises one single stopping surface 1259 shaped and dimensioned to cooperate with (i.e. to abut against, when the roller blind reaches the relevant end position) the single stopping surface 1173 of the limit screw 1162.

Moreover, even if in the embodiment show, the limit nut 250 is configured to abut against the winding stopper 172 of the limit screw 162 when the roller blind 56 reaches the upper end position corresponding to the retracted configuration thereof, it could also be conceived a roller blind limiter assembly wherein the limit nut would abut the winding stopper when the roller blind reaches the lower end position (i.e. corresponding to the extended configuration) or a roller blind limiter assembly wherein one or more limit nuts would abut one or more winding stoppers when the roller blind reaches each of the upper and lower end positions.

Bearing Sleeve

As represented for instance in FIGS. 7A and 7B, the roller blind mechanism 100 further comprises a bearing sleeve 300.

The bearing sleeve 300 extends along the first axis X1 and comprises a spring-receiving end 302 (or spring-supporting end 302, or torsion spring-mounting end 302), at a distal end thereof, having a substantially cylindrical shape, and a bearing body 304 having also a substantially cylindrical shape with a stopper-receiving cavity 305 (or limiter assembly-receiving cavity 305) formed therein. The limiter assembly-receiving cavity 305 opens out at a proximal end 306 of the bearing sleeve 300.

As represented for instance in FIG. 6, the spring-receiving end 302 has a cross-section smaller than a cross-section of the bearing body 304 and a tube-supporting portion 308 is formed between the bearing body 304 and the spring-receiving end 302.

As represented in FIG. 6, a limit screw engagement cavity 310 (or limit screw-mounting cavity 310) is formed in the spring-receiving end 302 that is dimensioned to receive and maintain the bearing sleeve-engaging portion 168 of the limit screw 162 and that opens out in the distal end of the bearing sleeve 300 and in the limiter assembly-receiving cavity 305. In other words, a through opening extending along the first axis X1 is formed in the bearing sleeve 300 between the distal and proximal portions. In the embodiment shown, a protrusion 309 extends in the limit screw-mounting cavity 310 to retain free ends of the flexible tongues of the bearing sleeve-engaging portion 168. A roller blind mechanism having any other suitable mechanical fasteners between the bearing sleeve and the roller blind-stopping system could be conceived.

As represented in FIG. 6, the limiter assembly-receiving cavity 305 comprises a distal portion 312 having an inner cross-section substantially equal to an outer cross-section of the stopper 250. The distal portion 312 opens out in the limit screw-mounting cavity 310. Moreover, the limiter assembly-receiving cavity 305 comprises a proximal portion 314 opening out in the proximal end 306 of the bearing sleeve 300. The proximal portion 314 has an inner cross-section that is shaped and dimensioned for a portion of the roller blind-stopping system 160 (namely at least a portion of the threaded spindle 170, for instance at least a portion of the proximal end portion 169 thereof) to be snugly fitted therein.

As represented in FIG. 6, the bearing sleeve 300 is thus shaped and dimensioned to contain at least partially the roller blind limiter assembly 150. The bracket-mounting portion 194 (or holding portion 194) of the roller blind-stopping system 160 protrudes outwardly from the limiter assembly-receiving cavity 305 at the proximal end 306 when the roller blind limiter assembly 150 is at least partially inserted into the limiter assembly-receiving cavity 305.

As represented for instance in FIGS. 7A and 7B, the bearing body 304 has an outer surface with angular couplers 316 formed thereon and dimensioned to cooperate with corresponding angular couplers (not represented) formed in an inner surface of the roller blind tube 52, so that when the roller blind system 10 is inserted into the mechanism-receiving cavity 54, the bearing sleeve 300 and the roller blind tube 52 are angularly coupled to each other upon rotation of the bearing sleeve 300 about the first axis X1. In other words, the bearing sleeve 300 is shaped and dimensioned to be rotated about the first axis X1 when the roller blind tube 52 is rotated about the first axis X1. For instance, the angular couplers of the bearing body 304 and the roller blind tube 52 are substantially dovetailed but any other angular couplers could be conceived.

Moreover, as represented in FIG. 6, the distal portion 312 of the limiter assembly-receiving cavity 305 has an inner surface with angular couplers 318 formed thereon that are shaped and dimensioned to cooperate with the angular couplers 254 formed on the outer surface 252 of the limit nut 250 so that when the limit nut 250, once it is engaged with the threaded spindle 170 of the limit screw 162, is inserted into the limiter assembly-receiving cavity 305, the bearing sleeve 300 and the stopper 250 are angularly coupled to each other upon rotation of the bearing sleeve 300 about the first axis X1. In other words, the bearing sleeve 300 and the stopper 205 are shaped and dimensioned to be rotated together about the first axis X1 when the roller blind tube 52 is rotated about the first axis X1. For instance, the angular couplers 318, 254 are substantially dovetailed but any other angular couplers could be conceived.

It is thus understood that, when the roller blind tube 52 is rotated about the first axis X1, the bearing sleeve 300 and the stopper 250 inserted therein are also rotated about the first axis X1, whereas the roller blind-stopping system 160 is prevented from rotating about the first axis X1 (i.e. is fixedly mounted to the roller blind support). A bearing surface 320, as represented in FIG. 3, is thus formed between the bearing sleeve 300 and the roller blind-stopping system 160, and more particularly, in the embodiment shown, between the inner surface of the proximal portion 314 of the limiter assembly-receiving cavity 305 and the threaded spindle 170 of the abutting assembly 160.

It is appreciated that the shape and the configuration of the bearing sleeve 300 can vary from the embodiment shown. It is understood that the bearing sleeve 300 forms an interface between the limit nut 250 and the roller blind tube 52 to operatively couple together the limit nut 250 and the roller blind tube 52. It could also be conceived an interface having any other shape and dimension, or even a roller blind mechanism wherein the limit nut 250 would be directly operatively coupled to the roller blind tube 52.

Spring-Supporting Sleeve

Referring back to FIGS. 4A and 4B, the roller blind mechanism 100 further comprises a spring-supporting sleeve 350 located at the free extremity 120 of the roller blind mechanism 100.

In the embodiment shown, the spring-supporting sleeve 350 extends along the first axis X1. A shaft-receiving cavity 352 is formed therein and is shaped and dimensioned to prevent the spring-supporting sleeve 350 from pivoting about the coupling shaft 130 received therein upon actuation of the actuator 60 (i.e. upon rotation of the roller blind tube 52 about the first axis X1). The spring-supporting sleeve 350 has a support-mounting end portion 354 at a distal end thereof (considered with respect to the support-engaging member 164), and a spring-supporting portion 356 at a proximal end thereof. Moreover, as represented in particular in FIG. 3, in the embodiment shown, the spring-supporting sleeve 350 comprises a tube-supporting portion 358, having a cross-section greater than a cross-section of the spring-supporting portion 356, and extending between the spring-supporting portion 356 and the support-mounting end portion 354.

It is appreciated that the shape and the configuration of the spring-supporting sleeve 350 can vary from the embodiment shown.

It is thus understood that, in the embodiment shown, the coupling shaft 130 extends and is maintained between the spring-supporting sleeve 350 and the roller blind-stopping system 160. More particularly, a distal end portion 134 of the shaft 130 is received in the shaft-receiving cavity 352 of the spring-supporting sleeve 350 and the first end portion 132 (or proximal end portion 132) of the shaft 130 is received in the shaft-receiving cavity 174 formed in the limit screw 162 of the roller blind-stopping assembly 160. Due to the above-described mounting of the roller blind-stopping system 160 to the roller blind-supporting bracket 80 (or more generally the mounting of the roller blind-stopping system 160 to the roller blind support) via, in a direct or an indirect manner, the support-engaging member 164, the shaft 130 is prevented from rotating about the first axis X1 when the roller blind tube 52, which is angularly coupled to the bearing sleeve 300 and the stopper 250, is pivoted about the first axis X1.

Helical Torsion Spring

The roller blind mechanism 100 further comprises a helical torsion spring 400 which is configured to store energy when the roller blind assembly 50 is unwound (i.e. when the roller blind 56 is extended), and to ease the winding of the roller blind assembly 50 (i.e. to ease the winding—for instance of the fabric secured to the roller blind tube 52—of the roller blind tube assembly 50, i.e. to ease the configuration of the roller blind 56 into the retracted configuration or into any intermediate configuration between the extended configuration and the retracted configuration).

The torsion spring 400 might also be referred to as a balance spring as it is configured to substantially balance—or substantially compensate—the torque applied to the roller blind tube 52 due to the weight of the fabric 56 (or blind 56) for the different vertical positions of the lower edge thereof between the wound and unwound configurations of the roller blind tube assembly 50 (i.e. between the retracted and the extended configurations of the blind 56).

As represented for instance in FIG. 3, the helical torsion spring 400 extends along the first axis X1 and surrounds at least partially the shaft 130. The torsion spring 400 comprises a first fixed end portion 410 (or distal end portion 410, considered with regards to the roller blind bracket 80 or to the roller blind limiter assembly 150) engaged with the spring-supporting portion 356 of the spring-supporting sleeve 350, and an opposed rotatable end portion 412 (or proximal distal end portion 412) engaged with the spring-receiving end 302 (on an outer surface thereof) of the bearing sleeve 300.

It is thus understood that when the roller blind tube 52 is pivoted about the first axis X1 to extend the roller blind 56 (for instance upon actuation of the actuator 60 of the roller blind system 10 to extend the roller blind 56), the torsion spring 400 is tensed or loaded and stores energy. Reversely, when the roller blind tube 52 is pivoted about the first axis X1 to retract the roller blind 56 (for instance upon actuation of the actuator 60 to retract the roller blind 56), the torsion spring 400 extends and releases the stored energy.

Spring Stiffness Adjuster

It is known that a spring constant of the helical torsion spring 400 has to be chosen as close as possible, for the different configurations of the roller blind tube 52 between the wound configuration and the unwound configuration (i.e. for the different configurations of the blind 56 between the retracted and the extended configurations, i.e. between the upper and lower end positions thereof), to the torque applied to the roller blind tube 52 by the fabric 56 (or blind 56) comprising for instance the weight bar 58.

To this end, the roller blind mechanism 100 firstly comprises a spring stiffness adjuster 450 represented, for instance, in FIGS. 3, 4A, 4B and 29.

The spring stiffness adjuster 450 extends along the first axis X1 and is shaped and dimensioned to be at least partially surrounded by the torsion spring 400. The spring stiffness adjuster 450 comprises in the embodiment shown a shaft-receiving through opening 452 with a substantially square-shaped cross-section, in the embodiment shown, for the spring stiffness adjuster 450 to be displaceable along at least a portion of the shaft 130. The spring stiffness adjuster 450 has an outer cross-section equal to or smaller than an inner cross-section of the helical torsion spring 400 and is inserted into an inner cavity defined by the helical torsion spring 400.

Figure 29:
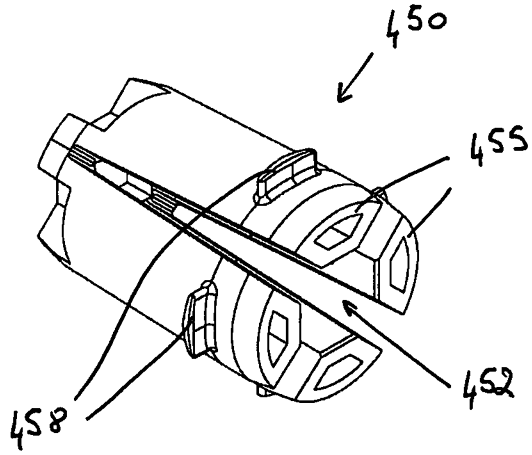
FIG. 29 is a side perspective view of the spring stiffness adjuster of FIG. 3.

Moreover, the spring stiffness adjuster 450 comprises a spring-anchoring portion 454, for instance at a proximal end thereof. The spring-anchoring portion 454 might have a substantially cylindrical shape. In the embodiment shown, the spring-anchoring portion 454 comprises a plurality of anchoring members 455 mobile with respect to each other, for the spring-anchoring portion 454 to be configured in a compact configuration wherein the spring-anchoring portion has a first outer cross-section, and in a deployed configuration (as represented in FIG. 29), wherein the spring-anchoring portion has a second outer cross-section greater than the first outer cross-section. In other words, the spring-anchoring portion 454 is extendable in a radial direction upon displacement (for instance pivoting) of the anchoring members 455.

Moreover, the spring stiffness adjuster 450 comprises a threaded portion 456, for instance at a distal end thereof. In other words, a thread 458 is formed on an outer surface of the spring stiffness adjuster 450. The thread 458 is designed to substantially conform to the coils of the helical torsion spring 400 and the spring stiffness adjuster 450 is thus configured to be axially displaced along the longitudinal direction X1 with regards to the torsion spring 400 so as to adjust the stiffness of the helical torsion spring 400. For instance, the thread 458 is formed of a plurality of spaced-apart thread portions.

Figure 19:
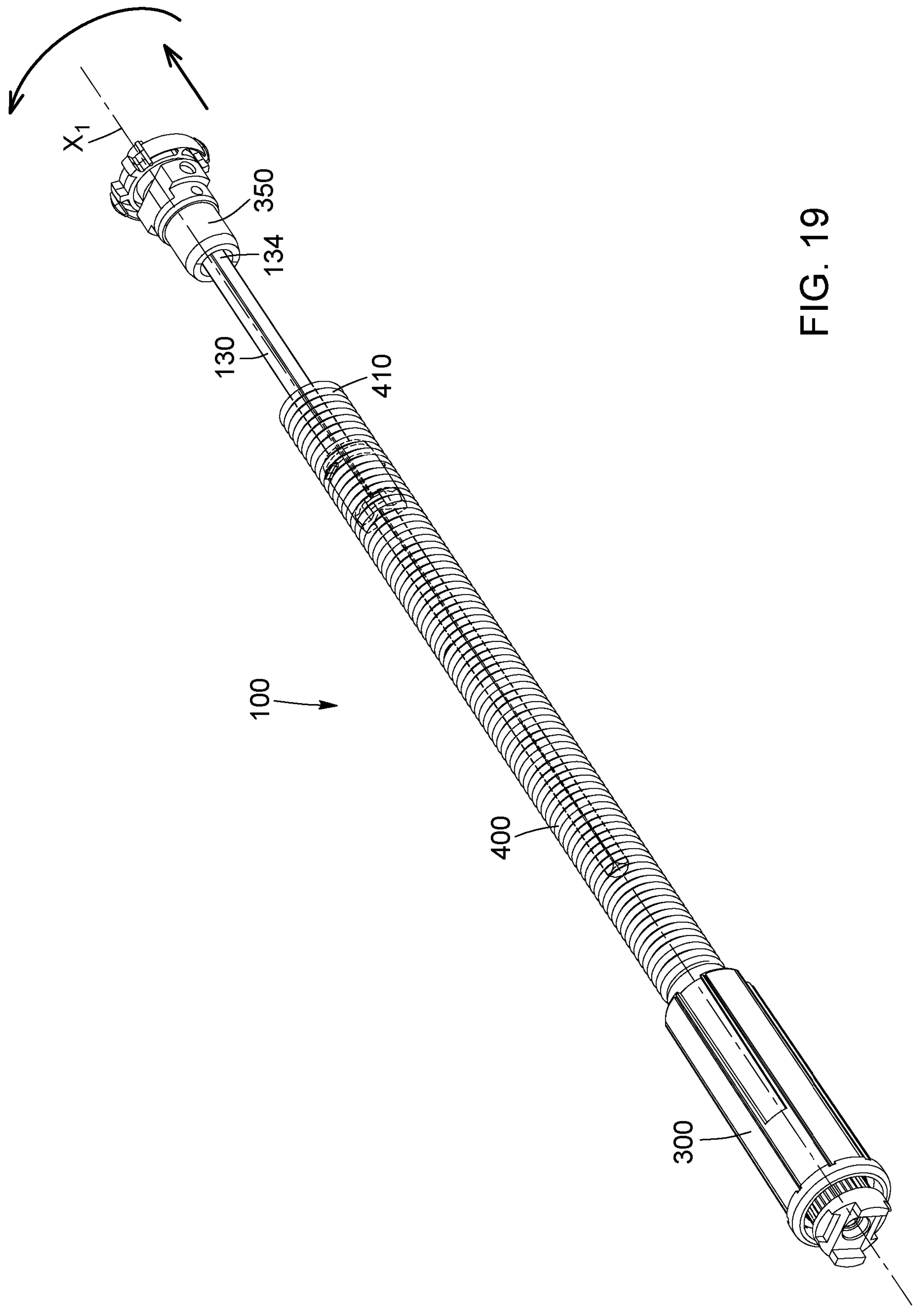
FIG. 19 is a perspective view of the roller blind mechanism of FIG. 1, the roller blind mechanism being in a spring stiffness adjustment configuration.
Figure 20:
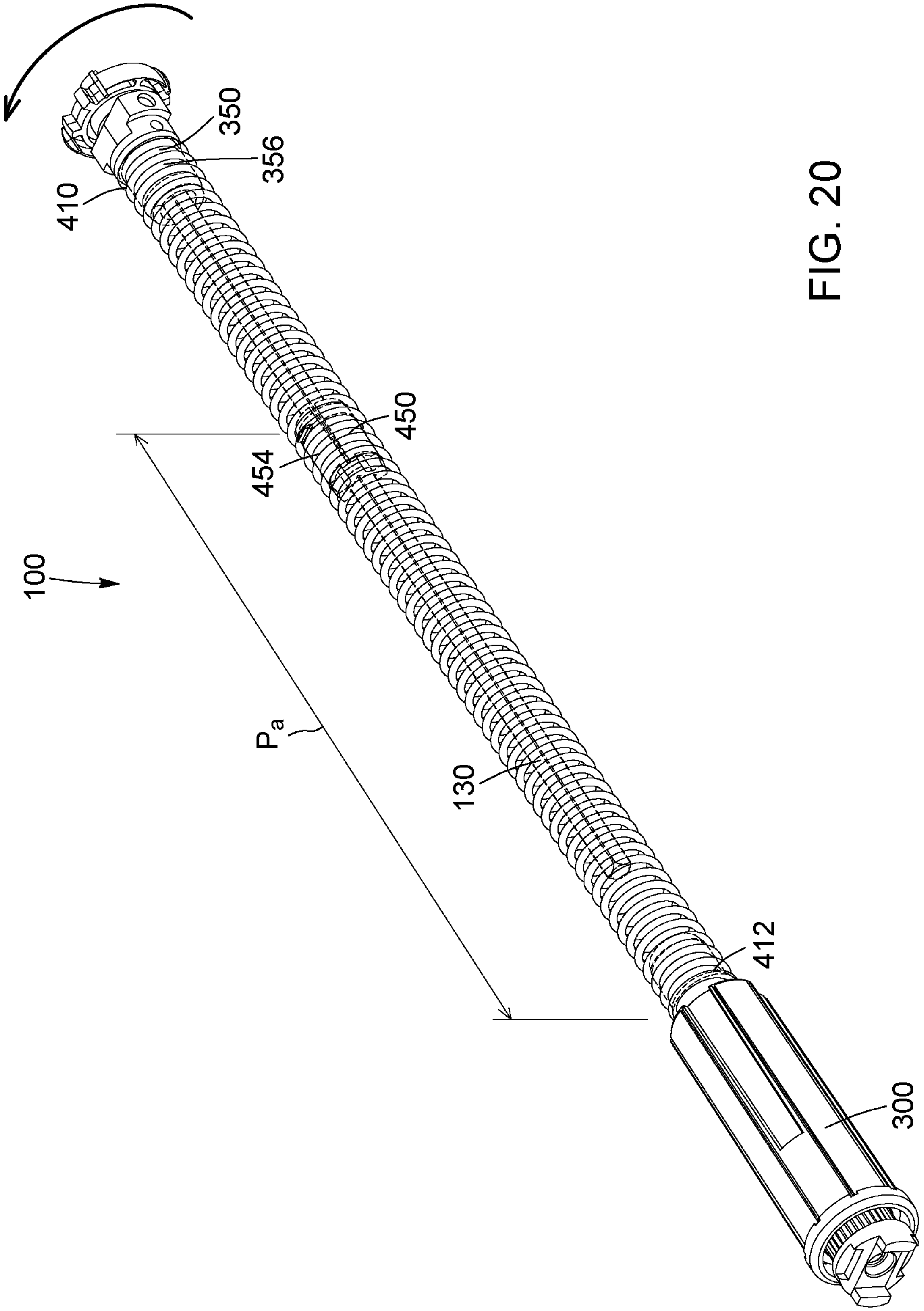
FIG. 20 is a perspective view of the roller blind mechanism of FIG. 1, the roller blind mechanism being in the spring-preloading configuration.

The present disclosure thus also concerns a method for adjusting the spring stiffness of the helical torsion spring 400. To this end, as represented in FIG. 19, the distal end portion 410 of the helical torsion spring 400 is firstly disengaged from the spring-supporting sleeve 350. Then, the spring-supporting sleeve 350, which is fixedly mounted to the distal end portion 134 of the shaft 130, is rotated about the first axis X1. Since the spring stiffness adjuster 450 is angularly coupled to the shaft 130 via the engagement thereof in the shaft-receiving through opening 452, the shaft 130 is also rotated about the first axis X1. It is thus understood that the spring stiffness adjuster 450 is angularly coupled to the support-engaging member 164 upon pivoting of the roller blind tube 52 about the longitudinal axis X1, when the roller blind limiter assembly 150 is in the locked configuration.

The cooperation between the thread 458 of the spring stiffness adjuster 450 and the coils of the torsion spring 400 is of the worm-drive type so that the spring stiffness adjuster 450 is axially displaced within the inner cavity of the torsion spring 400 upon rotation of the shaft 130. Then, the helical torsion spring 400 is preloaded (i.e. one of its end portions 410, 412—the distal end portion 410 in the embodiment shown—is pivoted about the first axis X1 prior to the pivoting of the roller blind tube 52 about the first axis X1). To this end, as represented in FIG. 22, the distal end portion 410 is firstly engaged with the spring-supporting portion 356 of the spring-supporting sleeve 350. Then, the spring-supporting sleeve 350 is rotated about the first axis X1 in a direction opposed to the coiling direction of the helical torsion spring 400, to reduce the inner cross-section of the torsion spring 400. The coils of the portion of the torsion spring 400 facing the spring-anchoring portion 454 thus abut against an outer surface of the spring anchoring portion 454 to limit the active portion of the helical torsion spring 400 (i.e. the portion of the helical torsion spring 400 having resilient properties) to the portion Pa of the helical torsion spring 400 defined between the proximal end portion 412 engaged with the bearing sleeve 300 and the spring-anchoring portion 454 of the spring stiffness adjuster 450. The reduction of the inner cross-section of the torsion spring 400 could be combined with and/or replaced by the increase of the outer cross-section of the spring-anchoring portion 454 via radial displacement of the anchoring members 455. Such a radial displacement of the anchoring members 455 could be realized upon cooperation of the spring stiffness adjuster 450 with a corresponding portion of the coupling shaft 130 (not represented) or upon cooperation of the spring stiffness adjuster 450 with a dedicated shaft 140 (FIGS. 26 and 27).

Figure 26:
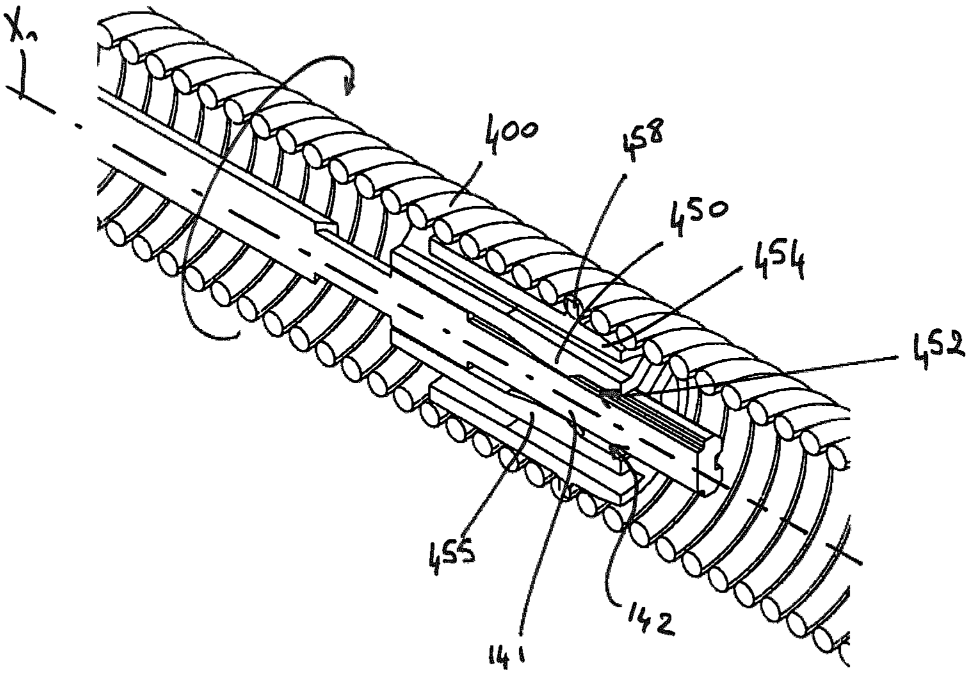
FIG. 26 is a perspective cross section view of the roller blind mechanism of FIG. 1, the spring stiffness adjuster cooperating with a spring stiffness-adjusting shaft.
Figure 27:
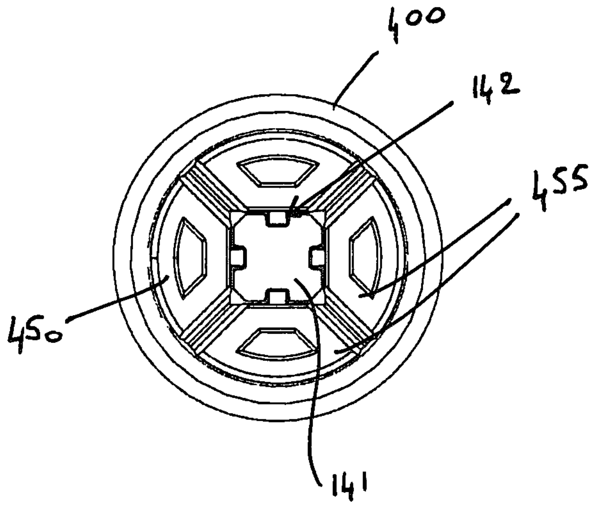
FIG. 27 is a cross section of the spring stiffness adjuster and the spring stiffness-adjusting shaft of FIG. 26.
Figure 28:
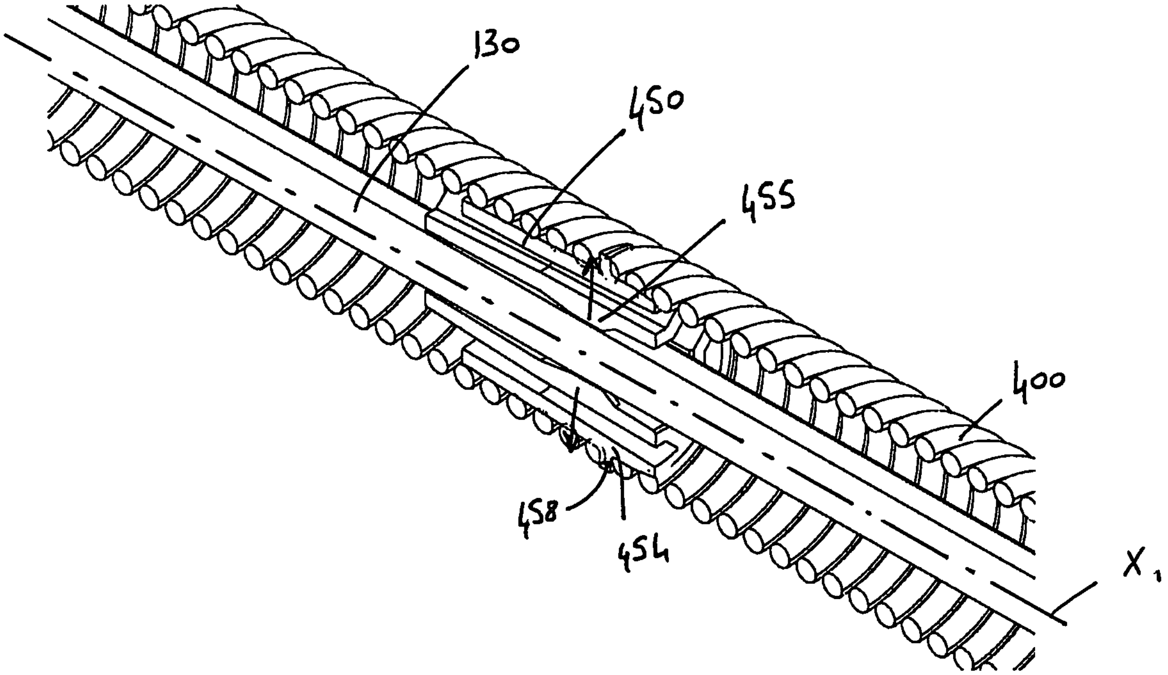
FIG. 28 is a perspective cross section view of the roller blind mechanism of FIG. 1, the spring stiffness adjuster cooperating with the coupling shaft.

As represented in FIGS. 26 to 28, the method for adjusting the spring stiffness of the helical torsion spring 400 might comprise a step of engaging a spring stiffness-adjusting shaft 140 with the spring stiffness adjuster 450 engaged with the helical torsion spring 400, the spring-anchoring portion 454 being configured in the compact configuration. In the embodiment shown, the spring stiffness-adjusting shaft 140 comprises an adjuster-coupling portion 141 angularly couplable with an inner surface of the shaft-receiving through opening 452. Anchoring member-receiving slots 142 are formed in the adjuster-coupling portion 141 that are shaped and dimensioned to receive at least partially an inner portion of the anchoring members 455. The adjuster-coupling shaft 141 is shaped and dimensioned so that upon pivoting of the spring stiffness-adjusting shaft 140 about its longitudinal axis (i.e. about the first axis X1), the spring stiffness adjuster 450 is axially displaced within the inner cavity of the torsion spring 400 (i.e. along the first axis X1) without the spring stiffness-adjusting shaft 140 configuring the spring-anchoring portion 454 in the deployed configuration.

The method further comprises a step of removing the spring stiffness-adjusting shaft 140 from the torsion spring 400 and from the spring stiffness adjuster 450, and a step of engaging the coupling shaft 130 (FIG. 28) within the torsion spring 400 and the shaft-receiving through opening 452 of the spring stiffness adjuster 450. In the embodiment shown, the coupling shaft 130 has a substantially constant cross-section which is greater than an inner cross section of the shaft-receiving through opening 452 at least partially delimited by the anchoring members 455. The coupling shaft 130 is thus shaped and dimensioned to configure the spring-anchoring portion 454 in the deployed configuration upon engagement of the coupling shaft 130 within the shaft-receiving through opening 452 of the spring stiffness adjuster 450.

In other words, the cooperation of the spring stiffness adjuster 450 with the spring stiffness-adjusting shaft 140 allows axial displacement of the spring stiffness adjuster 450 along the torsion spring 400 in both directions (i.e. along the first axis X1), the spring-anchoring portion 454 being in the compact configuration. The cooperation of the coupling shaft 130 with the spring stiffness adjuster 450 allows configuring the spring-anchoring portion 454 of the spring stiffness adjuster 450 in the deployed configuration so as to prevent axial displacement of the spring stiffness adjuster 450 along the torsion spring 400. It could also be conceived a shaft that would be shaped and dimensioned to allow both the axial displacement of the spring stiffness adjuster 450 along the torsion spring 400 and the radial displacement of the anchoring members 455 (i.e. the configuration of the spring-anchoring portion 454 in the deployed configuration), for instance via a deployable portion of such a shaft (not represented).

The number of active coils of the helical torsion spring 400 being smaller compared to a torsion spring 400 without a spring stiffness adjuster 450 engaged therewith and at least partially surrounded thereby, it is understood that the stiffness of the helical torsion spring 400 with the spring stiffness adjuster 450 engaged therewith is increased compared to a torsion spring 400 without a spring stiffness adjuster 450. In other words, the spring stiffness adjuster 450 allows to directly adjust the number of active coils of the helical torsion spring 400.

In the embodiment shown, the rotatable end portion 412 of the torsion spring 400 is located between the fixed end portion 410 thereof and the roller blind limiter assembly 150. It could also be conceived a roller blind system wherein the fixed end portion of the torsion spring would be located between the rotatable end portion thereof and the roller blind limiter assembly.

It is appreciated that the shape, the configuration, and the location of the spring stiffness adjuster 450 with regards to the torsion spring 400, as well as the shape and configuration of the spring-anchoring portion 454 and the threaded portion 456, can vary from the embodiment shown. It could for instance be conceived a spring stiffness adjuster with a spring-anchoring portion 454 that would be formed of a single piece.

Figure 22A:
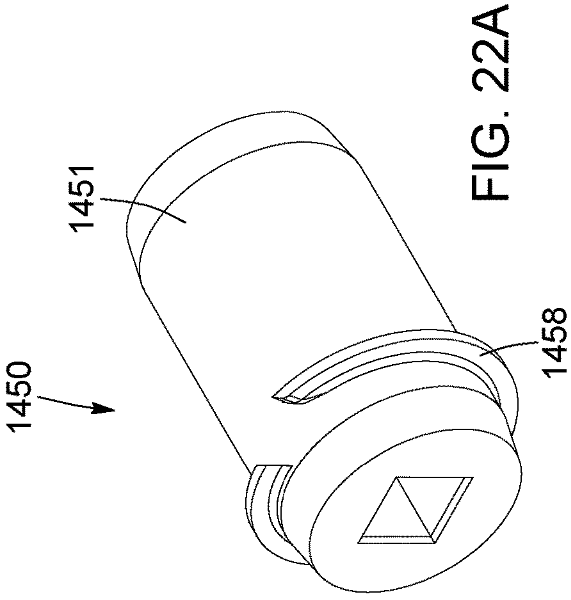
FIGS. 22A and 22B are respective right and left perspective views of a spring stiffness adjuster in accordance with another embodiment.
Figure 22B:
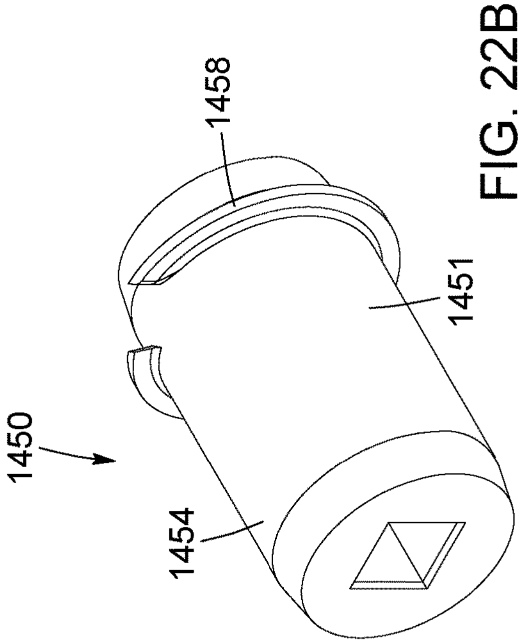

FIGS. 22A and 22B represent another possible embodiment of the spring stiffness adjuster 1450. In the embodiment shown, the spring stiffness adjuster 1450 has a substantially cylindrical body 1451 forming a spring-anchoring portion 1454 made of a single element. The spring stiffness adjuster 1450 further comprises a thread 1458 formed on an outer surface of the adjuster body 1451 and extending substantially around an entirety of the periphery thereof.

Figure 23:
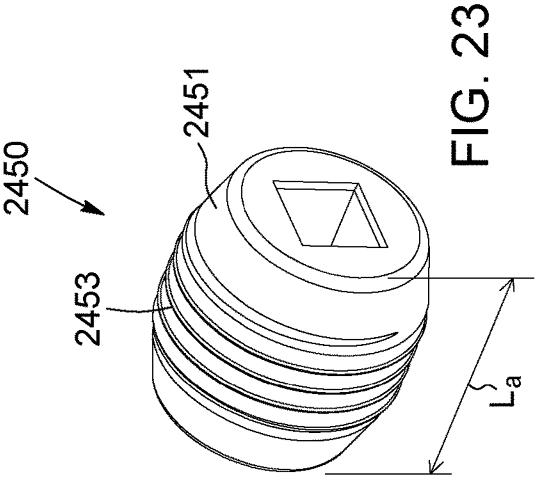
FIG. 23 is a perspective view of a spring stiffness adjuster in accordance with another embodiment.

FIG. 23 represents another possible embodiment wherein the spring stiffness adjuster 2450 has an adjuster body 2451 with a varying cross-section along a length La thereof. In the embodiment shown, the spring stiffness adjuster 2450 has a plane of symmetry extending transversally (for instance perpendicularly) to the length La. The spring stiffness adjuster 2450 thus comprises first and second lateral portions with a cross-section increasing from a free end thereof toward a middle portion of the spring stiffness adjuster 2450. In other words, the middle portion 2453 has a cross-section greater than cross-sections of the first and second lateral portions (and more particularly greater than free ends thereof). The spring stiffness adjuster 2450 further comprises a thread 2458 formed on an outer surface of the adjuster body 2451 and extending along a significant portion of the length La (in the embodiment shown, along more than about 50% of the length La).

Figure 24:
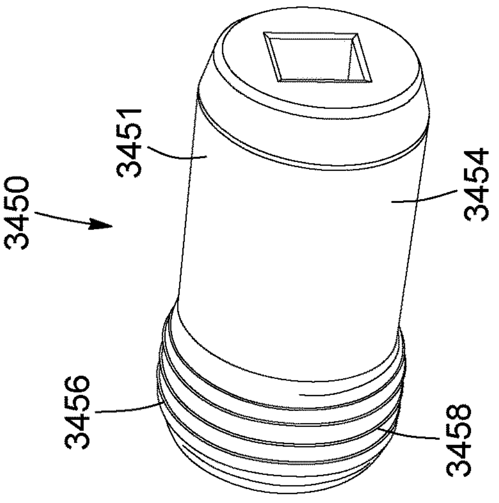
FIG. 24 is a perspective view of a spring stiffness adjuster in accordance with another embodiment.
Figure 25:
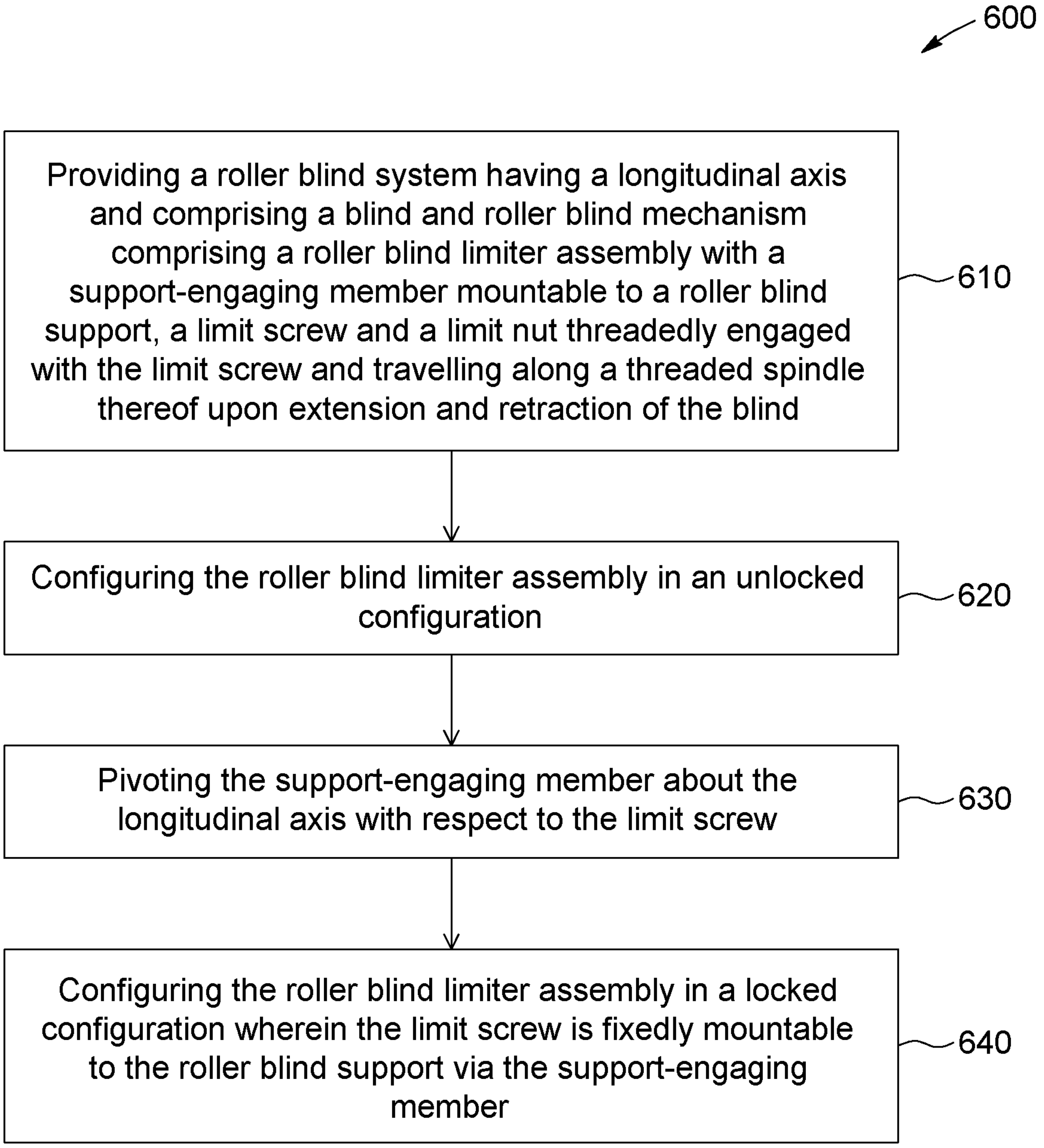
FIG. 25 is a block diagram of the sequential steps of a method for adjusting an end position of a roller blind.

FIG. 24 represents another possible embodiment of the spring stiffness adjuster 3450. In the embodiment shown, the spring stiffness adjuster 3450 has a substantially cylindrical body 3451 forming a spring-anchoring portion 3454 made of a single element. The spring stiffness adjuster 3450 further comprises a threaded portion 3456 having a substantially cylindrical shape with an outer cross-section greater than an outer cross-section of the spring-anchoring portion 3454. A thread 3458 formed on an outer surface of the threaded portion 3456 and extending along substantially an entirety of a length thereof.

It is thus understood that, once the desired longitudinal position of the spring stiffness adjuster with regards to the torsion spring is reached, the axial displacement of the spring stiffness adjuster is prevented either by the cooperation of the torsion spring with the spring-anchoring portion of the spring stiffness adjuster upon reduction of the inner cross-section of the torsion spring (for instance in the embodiments shown in FIGS. 22A to 24), or by the cooperation of the spring stiffness adjuster with the torsion spring upon increase of the outer cross-section of the spring-anchoring portion of the spring stiffness adjuster (for instance in the embodiment shown in FIGS. 26 to 29).

Figure 18:
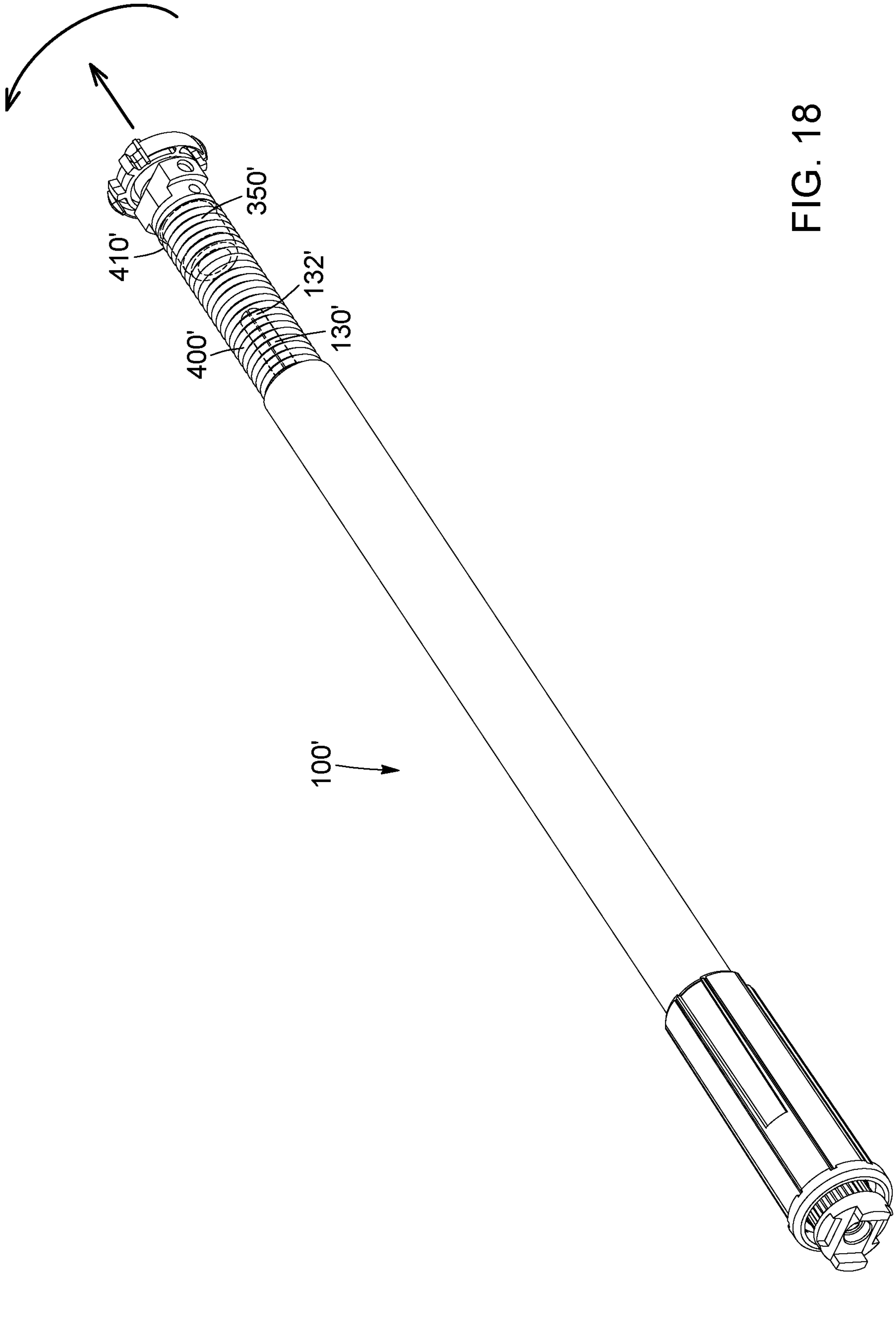
FIG. 18 is a perspective view of a roller blind mechanism in accordance with another embodiment, the roller blind mechanism having no spring stiffness adjuster and being in a spring-preloading configuration.

Moreover, it is understood that the roller blind mechanism 100' might also be used to preload the helical torsion spring 400' even when no spring stiffness adjuster is inserted into the helical torsion spring 400', as represented in FIG. 18. To this end, the coupling shaft 130' is firstly disengaged from the shaft-receiving cavity of the spring-supporting sleeve 350' by axially displacing the spring-supporting sleeve 350'. The helical torsion spring 400' fixedly mounted to the spring-supporting sleeve 350' is thus extended. The spring-supporting sleeve 350' with the distal end portion 410' of the helical torsion spring 400' engaged therewith is then pivoted about the first axis X1, in a direction opposed to the coiling direction of the helical torsion spring 400'.

It is further understood that the preloading of the helical torsion spring 400, with or without the spring stiffness adjuster 450 therein, is made possible, in the disclosed roller blind mechanism 100, by the engagement of the proximal end portion 412 with the spring-receiving end 302 of the bearing sleeve 300. The engagement of the proximal end portion 412 (or rotatable end portion 412) of the spring 400 to the bearing sleeve 300 also allows maintaining the preload applied to the spring 400. Moreover, the preloading of the helical torsion spring 400, with or without the spring stiffness adjuster 450 therein, is also made possible by the roller blind limiter assembly 150 and by the stopper 250 abuttable against the winding stopper 172 of the roller blind-stopping system 160: when the stopper 250 is not in an abutting configuration with the abutting assembly 160 while the spring-supporting sleeve 350 with the distal end portion 410 of the helical torsion spring 400 engaged therewith is pivoted about the first axis X1, the bearing sleeve 300 will be pivoted about the first axis X1 until the stopper 250 abuts the winding stopper 172 of the abutting assembly 160. Once the stopper 250 is configured in the abutting configuration, the bearing sleeve 300 will be prevented from rotating about the first axis X1 when the spring supporting sleeve 350 with the distal end portion 410 of the helical torsion spring 400 engaged therewith is further pivoted about the first axis X1, thus allowing the preloading of the helical torsion spring 400. It is thus understood that the roller blind limiter assembly 150 of the roller blind mechanism 100 of the present disclosure allows maintaining the preloading of the helical torsion spring 400. The helical torsion spring 400 can thus easily be preloaded, for instance prior to the sending of the roller blind mechanism 100 to the final user.

Moreover, the adjustment of the stiffness of the helical torsion spring 400 as well as the preloading of the torsion spring 400 can be performed independently from the above-described adjustment of the winding position of the roller blind system 10 via the roller blind-stopping system 160.

As apparent in particular from FIGS. 4A and 4B, the above-described elements of the roller blind system 10 (for instance the roller blind tube 52, the bearing sleeve 300, the helical torsion spring 400, the spring stiffness adjuster 450, the roller blind limiter assembly 150) are substantially coaxial with other (and coaxial with the longitudinal direction X1).

Additional Components

Mechanism-Levelling System

As represented in FIGS. 15 to 17B, the roller blind mechanism 100 in accordance with the present disclosure might also comprise a mechanism-levelling system 700 fixedly mountable to the roller blind support and defining a roller blind stopper-receiving cavity 702 to receive at least partially the holding portion 194 of the roller blind-stopping system 160 (for instance to receive at least partially the support-engaging member 164 of the roller blind limiter assembly 150). In the embodiment shown, the roller blind stopper-receiving cavity 702 is substantially vertical.

The mechanism-levelling system 700 comprises a bottom abutting portion 710 at least partially supporting the holding portion 194 when received in the roller blind stopper-receiving cavity 702. The bottom abutting portion 710 is configurable into at least two vertical positions so as to adjust a vertical position of the holding portion 194, and thus so as to adjust a vertical position of the roller blind mechanism 100.

In the embodiment shown, the mechanism-levelling system 700 comprises a support-mounting member 720 in which the roller blind stopper-receiving cavity 702 is formed. For instance, the support-mounting member 702 comprises a support-mounting plate having a substantially circular shape. The support-mounting member 720 is fixedly mountable to the roller blind support via a levelling system fastener 722 insertable into a fastener-receiving opening 724 formed in the support-mounting member 720, for instance opening into the roller blind stopper-receiving cavity 702. In the embodiment shown, the fastener-receiving opening 724 is substantially oblong.

Moreover, the support-mounting member 720 comprises first and second vertical guiding rails 730, 732 at least partially delimiting the roller blind stopper-receiving cavity 702 (or roller blind stopper engagement slot 702). The support-mounting member 720 further comprises a bottom wall portion 734, for instance substantially arcuate (so as to conform to a lower portion of the support-engaging member 164, in the embodiment shown). The bottom abutting portion 710 protrudes inwardly with respect to the roller blind stopper-receiving cavity 702 from the bottom wall portion 734. The roller blind stopper-receiving cavity 702 opens at an upper portion 721 of the support-mounting member 720 so as to define therein a roller blind stopper insertion opening 704.

In the embodiment shown, the support-mounting member 720 comprises a levelling rod-receiving cavity 736, for instance formed in the bottom wall portion 734 thereof and opening into the roller blind stopper-receiving cavity 702. For instance, the levelling rod-receiving cavity 736 is substantially cylindrical and substantially coaxial with the roller blind stopper-receiving cavity 702. The mechanism-levelling system further comprises a levelling member 750 comprising a levelling body 752 engageable in the leveling rod-receiving cavity 736 and a protruding portion comprising the bottom abutting portion 710. The levelling member 750 is displaceable within the leveling rod-receiving cavity 736, so as to modify a length of the protruding portion comprising the bottom abutting portion 710, and thus so as to modify the vertical position of the bottom abutting portion 710. In the embodiment shown, the levelling body 752 comprises a threaded portion shaped and dimensioned to cooperate with a corresponding thread formed on an inner surface at least partially delimiting the leveling rod-receiving cavity 736.

In the embodiment shown, the roller blind mechanism 100 further comprises a mounting washer 760 at least partially engageable with the holding portion 194 of the roller blind-stopping system 160. The mounting washer 760—having for instance a substantially rectangular shape—is engageable at least partially in the roller blind stopper-receiving cavity 702 for the mounting washer 760 to be sandwiched between the support-mounting member 720 and the support-engaging member 164 of the roller blind-stopping system 160 when in use. In the embodiment shown, a fastener-receiving through opening 762 is formed in the mounting washer 760 shaped, located and dimensioned to be in register with the fastener-receiving opening 724 formed in the support-mounting member 720 and with a fastener-receiving aperture 193 formed in the holding portion 194 of the support-engaging member 164.

It is thus understood that the mechanism-levelling system 700 (or roller blind mechanism-levelling system 700) is configured to adjust the vertical position of the roller blind mechanism 100 when mounted to—or engaged with—the roller blind support. The roller blind limiter assembly 150 is indirectly mounted to the roller blind support via the mechanism-levelling system 700. In other words, the mechanism-leveling system 700 forms a mounting interface between the roller blind limiter assembly 150 (more particularly the support-engaging member 164 thereof) and the roller blind support. When the mechanism-leveling system 700 is mounted to the roller blind support with the holding portion 194 of the support-engaging member 164 at least partially inserted in the roller blind stopper-receiving cavity 702 thereof, a lower portion of the holding portion 194 is supported by the bottom abutting portion 710. In case the roller blind mechanism 100 would not be properly aligned (i.e. the vertical position of the roller blind limiter assembly 150 would not satisfactory, for instance if the roller blind mechanism 100 extends in a substantially inclined way with respect to a horizontal direction), the vertical position of the bottom abutting portion 710 can be modified (either lowered or raised), for instance from an outside of the roller blind stopper-receiving cavity 702, by cooperating with a lower end portion 753 of the leveling member 750 so as to displace the levelling body 752 within the leveling rod-receiving cavity 736. Moreover, the mechanism-levelling system 700 makes it possible to modify the vertical position of the roller blind mechanism 100 without modifying the shaped and dimensions of any of its components.

It is understood that, in the embodiment shown, when the holding portion 194 is at least partially inserted in the roller blind stopper-receiving cavity 702, the two support-mounting tabs 203 of the support-engaging member 164 are substantially vertically aligned with each other.

It is appreciated that the shape and the configuration of the mechanism-levelling system can vary from the embodiment shown.

Support-Mounting Sleeve

As represented in FIGS. 1, 2 and 12, the roller blind mechanism 100 further comprises a support-mounting sleeve 40 having for instance a substantially cylindrical shape. The support-mounting sleeve 40 has a bearing sleeve-receiving cavity formed therein that is shaped and dimensioned to receive at least partially the bearing sleeve 300. It is thus understood that the support-mounting sleeve 40 is shaped and dimensioned to form an interface, considered in a radial direction (i.e. substantially perpendicularly to the longitudinal axis X1) between the bearing sleeve 300 and the roller blind tube 52 (and thus an interface between the roller blind tube 52 and the limit nut 250). The support-mounting sleeve 40 thus makes it possible to use the roller blind mechanism 100 with roller blind tubes having mechanism-receiving cavities of different dimensioned.

The support-mounting sleeve 40 thus comprises outer angular couplers 42 and inner angular couplers formed on outer and inner surfaces thereof and configured to cooperate respectively with the angular couplers formed on the inner surface of the roller blind tube 52 and the angular couplers 316 formed on the outer surface of the bearing body 304 of the bearing sleeve 300.

It is appreciated that the support-mounting sleeve 40 is optional and that the shape and the configuration of the support-mounting sleeve 40 can vary from the embodiment shown.

Rotation Bearing

The adjustable roller blind mechanism 100 further comprises, as represented in FIGS. 2 to 4B, a rotation bearing 500.

The rotation bearing 500 has an outer surface with angular couplers 502 formed thereon, that are configured to cooperate with corresponding angular couplers formed on the inner surface of the roller blind tube 52 so that when the roller blind system mechanism 100 is inserted into the mechanism-receiving cavity 54, the rotation bearing 500 and the roller blind tube 52 are angularly coupled to each other upon rotation of the roller blind tube 52 about the first axis X1 (for instance upon actuation of the actuator 60). The rotation bearing 500 is thus configured to contribute to maintaining the roller blind mechanism 100 within the mechanism-receiving cavity 54 formed in the roller blind tube 52.

The rotation bearing 500 further comprises flexible tongues 506 protruding outwardly from the outer surface thereof that are dimensioned and configured so that the rotation bearing 500 conforms to the inner surface of the roller blind tube 52. The flexible tongues 506 thus contribute to the angular coupling of the rotation bearing 500 and the roller blind tube 52 and limit the risk of a roller blind mounting that would be either too tight or too loose, that would not be satisfactory and/or that might cause undesirable noises. It is understood that the number, shape and dimensions of the flexible tongues 506 are not limited to the embodiment shown.

Moreover, the rotation bearing 500 has an inner cavity 504 formed therein, extending along the first axis X1 and configured for the mounting-end portion 354 of the spring-supporting sleeve 350 to be rotatably mounted thereto. In other words, when the rotation bearing 500 is driven in rotation about the first axis X1 by the roller blind tube 52, the spring-supporting sleeve 350 is prevented from rotating about the first axis X1.

Protective Tube

The adjustable roller blind mechanism 100 further comprises, in the embodiment shown, as represented for instance in FIGS. 2, 4A and 4B, a protective tube 520 extending between the spring-supporting sleeve 350 and the bearing sleeve 300 and at least partially surrounding the helical torsion spring 400, so as to protect the helical torsion spring 400. In the embodiment shown, the protective tube 520 comprises a distal end portion 522 supported by the tube-supporting portion 358 of the spring-supporting sleeve 350, and a proximal end portion 524 supported by the tube-supporting portion 308 of the bearing sleeve 300.

It is appreciated that the shape, the configuration, and the location of the protective tube 520 and the rotation bearing 500 can vary from the embodiment shown.

As represented in FIG. 1, the present disclosure also concerns a roller blind system 10 comprising a roller blind tube 52 defining a mechanism-receiving cavity 54 and a blind 56 mounted to the roller blind tube 52 (for instance to an outer surface thereof). The roller blind system 10 further comprises a roller blind mechanism 100 according to the present disclosure, the roller blind mechanism 100 being at least partially inserted into the mechanism-receiving cavity 54. The roller blind mechanism 100 is not limited to the disclosed embodiments and could comprise additional features, such as a blind-braking assembly configured to brake the winding and/or unwinding of the blind 56.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. A roller blind limiter assembly for a roller blind system comprising a roller blind tube with a blind mounted thereto, the blind being extendable and retractable between upper and lower end positions, the roller blind limiter assembly having a longitudinal direction and comprising:

a support-engaging member mountable to a roller blind support;

a limit screw comprising a threaded spindle and a winding stopper, the threaded spindle being dividable along the longitudinal direction into at least distal and proximal portions, the proximal portion being arranged longitudinally between the distal portion and the winding stopper; and a limit nut threadedly engaged with the threaded spindle of the limit screw, operatively connectable to the roller blind tube and travelling along the threaded spindle upon extension and retraction of the blind, wherein, in use, the limit nut abuts the winding stopper when the blind reaches one of the upper and lower end positions;

wherein the thread of the distal portion of the threaded spindle is smaller than the thread of the proximal portion.

2. The roller blind limiter assembly according to claim 1, wherein the roller blind limiter assembly is configurable in a locked configuration wherein the limit screw is fixedly mountable to the roller blind support via the support-engaging member, and an unlocked configuration wherein the support-engaging member is pivotable about the longitudinal direction with respect to the limit screw so as to modify said at least one of the upper and lower end positions.

3. The roller blind limiter assembly according to claim 2, comprising a limiter-locking assembly to lock the roller blind limiter assembly in the locked configuration, wherein the limiter-locking assembly comprises angular couplers angularly coupling together the limit screw and the support-engaging member when the roller blind limiter assembly is configured in the locked configuration and wherein the limiter-locking assembly comprises a resilient fastener biasing the limit screw and the support-engaging member toward each other along the longitudinal direction when the roller blind limiter assembly is configured in the locked configuration and wherein the resilient fastener is shaped and dimensioned to connect the limit screw and the support-engaging member together when the roller blind limiter assembly is configured in the unlocked configuration.

4. The roller blind limiter assembly according to claim 2, wherein the limit screw comprises a proximal end with an engagement member-receiving cavity formed therein, and wherein the support-engaging member comprises a screw-coupling portion at least partially engageable in the engagement member-receiving cavity at least when the roller blind limiter assembly is in the locked configuration, and wherein a screw shoulder is formed between the proximal end and the threaded spindle, the screw shoulder comprising the winding stopper.

5. The roller blind limiter assembly according to claim 1, wherein a thread formed on an inner surface of the limit nut comprises a distal thread portion and a proximal thread portion, the distal thread portion and the proximal thread portion of the limit nut being configured to cooperate respectively with the proximal thread portion and the distal thread portion of the limit screw.

6. The roller blind limiter assembly according to claim 1, wherein the winding stopper comprises a plurality of stopping surfaces equidistantly and coaxially distributed around the longitudinal direction, and wherein the limit nut comprises a corresponding plurality of stopping surfaces.

7. The roller blind limiter assembly according to claim 1, wherein the limit nut comprises an outer surface with one or more angular couplers formed thereon to angularly couple the limit nut with the roller blind tube when in use.

8. A roller blind mechanism for a roller blind system comprising a roller blind tube with a blind mounted thereto, the blind being extendable and retractable between upper and lower end positions, the roller blind mechanism comprising:

the roller blind limiter assembly according to claim 1;

a torsion spring extending along the longitudinal direction of the roller blind limiter assembly and having a fixed end portion engaged with the support-engaging member and a rotatable end portion angularly couplable with the roller blind tube; and a spring stiffness adjuster at least partially surrounded by the torsion spring, comprising a thread conforming to coils of the torsion spring to be displaceable along the torsion spring upon rotation of the spring stiffness adjuster about the longitudinal direction, and defining an active portion of the torsion spring upon loading of the torsion spring.

9. The roller blind mechanism according to claim 8, wherein the spring stiffness adjuster is angularly couplable to the support-engaging member, wherein a shaft-receiving through opening is formed in the spring stiffness adjuster, the roller blind mechanism comprising a coupling shaft engageable in the shaft-receiving through opening and angularly coupling together the spring stiffness adjuster and the roller blind limiter assembly when in use.

10. The roller blind mechanism according to claim 8, comprising a mechanism-levelling system fixedly mountable to the roller blind support and defining a roller blind stopper-receiving cavity to receive at least partially the support-engaging member of the roller blind limiter assembly, wherein the mechanism-levelling system comprises a bottom abutting portion at least partially supporting the support-engaging member when received in the stopper-receiving cavity, the bottom abutting portion being configurable into at least two vertical positions so as to adjust a vertical position of the roller blind mechanism.

11. A roller blind system comprising:

a roller blind tube defining a mechanism-receiving cavity;

a blind mounted to the roller blind tube; and the roller blind mechanism according to claim 8 inserted into the mechanism-receiving cavity.

12. A roller blind mechanism for a roller blind system comprising a roller blind tube with a blind mounted thereto, the blind being extendable and retractable between upper and lower end positions, the roller blind mechanism having a longitudinal direction and comprising:

a roller blind-stopping system comprising a holding portion, a threaded spindle and a winding stopper;

a limit nut threadedly engaged with the threaded spindle, operatively connectable to the roller blind tube and travelling along the threaded spindle upon extension and retraction of the blind, wherein, in use, the limit nut abuts the winding stopper when the blind reaches one of the upper and lower end positions; and a mechanism-levelling system fixedly mountable to a roller blind support and defining a roller blind stopper-receiving cavity to receive at least partially the holding portion of the roller blind-stopping system;

wherein the mechanism-levelling system comprises a bottom abutting portion at least partially supporting the holding portion when received in the roller blind stopper-receiving cavity, the bottom abutting portion being configurable into at least two vertical positions so as to adjust a vertical position of the roller blind mechanism.

13. The roller blind mechanism according to claim 12, wherein the mechanism-levelling system comprises a support-mounting member in which the roller blind stopper-receiving cavity is formed, and wherein the support-mounting member comprises first and second vertical guiding rails at least partially delimiting the roller blind stopper-receiving cavity.

14. The roller blind mechanism according to claim 13, wherein the support-mounting member comprises a bottom wall portion, the bottom abutting portion protruding inwardly from the bottom wall portion and wherein the support-mounting member comprises a levelling rod-receiving cavity, the mechanism-levelling system further comprising a levelling member comprising a levelling body engaged in the leveling rod-receiving cavity and a protruding portion forming the bottom abutting portion.

15. The roller blind mechanism according to claim 12, comprising a mounting washer at least partially engageable with the holding portion of the roller blind-stopping system, the mounting washer being sandwiched between the support-mounting member and the roller blind-stopping system when in use.

16. The roller blind mechanism according to claim 13, wherein the roller blind-stopping system comprises:
- a support-engaging member comprising the holding portion; and
- a limit screw comprising the threaded spindle and the winding stopper;

wherein the roller blind-stopping system is configurable in a locked configuration
wherein the limit screw is fixedly mountable to the roller blind support via the support-engaging member and the mechanism levelling system, and an unlocked configuration wherein the support-engaging member is pivotable about the longitudinal direction with respect to the limit screw so as to modify said at least one of the upper and lower end positions.

17. The roller blind mechanism according to claim 12, comprising:
- a torsion spring extending along the longitudinal direction and having a fixed end portion engaged with the roller blind-stopping system and a rotatable end portion angularly couplable with the roller blind tube; and
- a spring stiffness adjuster at least partially surrounded by the torsion spring, comprising a thread conforming to coils of the torsion spring to be displaceable along the torsion spring upon rotation of the spring stiffness adjuster about the longitudinal direction, and defining an active portion of the torsion spring upon loading of the torsion spring.

18. A method for adjusting an end position of a roller blind, comprising:
- providing a roller blind system comprising:
  - a roller blind tube defining a mechanism-receiving cavity and having a longitudinal direction;
  - a blind mounted to the roller blind tube and extendable and retractable between upper and lower end positions; and
  - a roller blind mechanism inserted into the mechanism-receiving cavity and comprising a roller blind limiter assembly with a support-engaging member mountable to a roller blind support, a limit screw comprising a threaded spindle and a winding stopper and a limit nut threadedly engaged with the threaded spindle of the limit screw, operatively connectable to the roller blind tube and travelling along the threaded spindle upon extension and retraction of the blind;
- configuring the roller blind limiter assembly in an unlocked configuration;
- pivoting the support-engaging member about the longitudinal direction with respect to the limit screw; and
- configuring the roller blind limiter assembly in a locked configuration wherein the limit screw is fixedly mountable to the roller blind support via the support-engaging member.

19. The method according to claim 18, wherein the limit screw comprises a proximal portion with an engagement member-receiving cavity formed therein and the support-engaging member comprises a screw-coupling portion at least partially engageable in the engagement member-receiving cavity at least when the roller blind limiter assembly is in the locked configuration, the method comprising:
- axially displacing the support-engaging member within the engagement member-receiving cavity;
- disengaging the roller blind system from the roller blind support; and
- pivoting the roller blind tube about the longitudinal direction to abut the limit nut against the winding stopper prior to configuring the roller blind limiter assembly in the unlocked configuration.

* * * * *